United States Patent
Karlsson et al.

(10) Patent No.: US 10,637,616 B2
(45) Date of Patent: *Apr. 28, 2020

(54) DYNAMIC COVERAGE ENHANCEMENT

(71) Applicant: Sony Mobile Communications Inc., Tokyo (JP)

(72) Inventors: Peter C. Karlsson, Lund (SE); Rickard Ljung, Helsingborg (SE); Vanja Plicanic Samuelsson, Lund (SE); Lars Nord, Lund (SE)

(73) Assignee: Sony Corporation, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 16/065,101

(22) PCT Filed: Dec. 22, 2015

(86) PCT No.: PCT/EP2015/081054
§ 371 (c)(1),
(2) Date: Jun. 21, 2018

(87) PCT Pub. No.: WO2017/108113
PCT Pub. Date: Jun. 29, 2017

(65) Prior Publication Data
US 2018/0375622 A1 Dec. 27, 2018

(51) Int. Cl.
*H04W 72/04* (2009.01)
*H04L 1/18* (2006.01)
(Continued)

(52) U.S. Cl.
CPC .......... *H04L 1/1819* (2013.01); *H04L 1/0013* (2013.01); *H04L 1/08* (2013.01);
(Continued)

(58) Field of Classification Search
CPC .. H04W 4/70; H04W 72/0473; H04L 1/1819; H04L 1/189
See application file for complete search history.

(56) References Cited

U.S. PATENT DOCUMENTS

2002/0016777 A1* 2/2002 Seamons .............. G06F 21/445
705/76
2005/0265282 A1 12/2005 Gross
(Continued)

FOREIGN PATENT DOCUMENTS

| EP | 2918402 A1 | 9/2015 |
| EP | 2919402 A1 | 9/2015 |
| WO | 2010034354 A1 | 4/2010 |

OTHER PUBLICATIONS

International Search Report and Written Opinion from corresponding International Application No. PCT/EP2015/081054, dated Sep. 7, 2016; 10 pages.
(Continued)

*Primary Examiner* — Wei Zhao
(74) *Attorney, Agent, or Firm* — Tucker Ellis LLP

(57) ABSTRACT

A plurality of payload messages (502, 505, 508) is communicated on a radio link of a cellular network between a terminal (130) and an access node (112) of the cellular network. Each one of the plurality of payload messages (502, 505, 508) includes a data packet (501) encoded according to a given redundancy version (371-373). The number of the plurality of payload messages (502, 505, 508) may be dynamically and flexibly adjusted in some embodiments. Examples are given which may be applied for coverage enhancement in the Internet of Things or Machine Type Communication domain.

18 Claims, 14 Drawing Sheets

(51) Int. Cl.
*H04L 1/08* (2006.01)
*H04W 4/70* (2018.01)
*H04L 1/00* (2006.01)
*H04L 5/00* (2006.01)

(52) U.S. Cl.
CPC ............ *H04L 1/189* (2013.01); *H04L 5/0055* (2013.01); *H04W 4/70* (2018.02); *H04W 72/0473* (2013.01)

(56) References Cited

U.S. PATENT DOCUMENTS

2011/0244800 A1* 10/2011 Bogestam .............. G06Q 30/02
455/41.2
2016/0353462 A1* 12/2016 Jiang .................... H04W 24/02

OTHER PUBLICATIONS

3GPP Technical Specification 36.321 V.12.7.0, Evolved Universal Terrestrial Radio Access (E-UTRA); Medium Access Control (MAC) protocol specification, Sep. 2015; 77 pages.
3GPP Technical Report 45.820 V13.0.0, Cellular system support for ultra-low complexity and low throughput Internet of Things (CioT), Aug. 2015; 495 pages.

* cited by examiner

DYNAMIC COVERAGE ENHANCEMENT

TECHNICAL FIELD

Various embodiments relate to a node of a cellular network and to a terminal attached to the cellular network. In particular, various embodiments relate to techniques of coverage enhancement by sending a plurality of messages including data encoded according to a given redundancy version.

BACKGROUND

Mobile communication by means of cellular networks is an integral part of modern life. One example of cellular networks is the Third Generation Partnership Project (3GPP) Long Term Evolution (LTE) technology.

The LTE technology is a scheduled technology where an access node—referred to as evolved node B (eNB) in the LTE framework—allocates time/frequency resources (resource blocks) for uplink (UL) and downlink (DL) communication. The LTE technology employs Transmission Time Intervals (TTI) offering a resource granularity of 1 millisecond; the TTIs are implemented by subframes.

Where a terminal requires to transmit UL payload data, it sends a UL transmission request and receives a corresponding UL transmission grant. Likewise, where the eNB requires to transmit DL data, it sends a DL assignment to the terminal to announce the DL data. Such techniques are referred to as scheduling.

In order to protect communication of data on the radio link, the LTE technology implements a Hybrid Automatic Repeat Request protocol (HARQ). Firstly, HARQ employs Forward Error Correction (FEC) by encoding data communicated in messages. By adding a respective checksum according to a coding scheme, errors occurring during transmission can be healed to some extent. Secondly, HARQ handles erroneously received data on a radio access level and is typically implemented by a Medium Access (MAC) layer of a transmission protocol stack of the terminal and the eNB, respectively. In detail, according to the LTE technology, a payload data message communicated on the radio link in subframe n is positively or negatively acknowledged in subframe n+4. Where the payload data message is negatively acknowledged (negative acknowledgment; NACK), retransmission of the payload data message—now encoded according to a different redundancy version—is implemented in subframe n+8. Such retransmission facilitates successful reception of the payload data message. Details of the HARQ protocol in the LTE technology are illustrated in the 3GPP Technical Specification (TS) 36.321 V. 12.7.0 (2015-09-25).

Implementing the HARQ protocol employing different redundancy versions for different retransmission attempts enables a certain degree of time diversity and, thus, increases the likelihood of successful transmission. Thereby, the total coverage of the cellular network may be increased.

However, it is sometimes desired to even further increase the coverage. A set of features where a comparably large coverage is achieved is referred to as Coverage Enhancement (CE). CE technology is envisioned to be applied for Machine Type Communication (MTC) and the Narrowband Internet of Things (NB-IoT), sometimes also referred to as NB-LTE. These techniques may be based on the LTE technology to some extent and may reuse some of the LTE concepts.

A key feature of the CE technology is to repeat each redundancy version of encoded data within the HARQ protocol a number of times. Such a repetition may be "blind", i.e., not in response to a respective retransmission request, but rather preemptive. Here, it is typically assumed that the repetitions of messages carrying one and the same redundancy version are implemented by a bundled transmission set of messages communicated in consecutive/subsequent subframes of a channel implemented on the radio link, see, e.g., 3GPP Technical Report (TR) 45.820 V 13.0.0 (2015-08), Section 6.2.1.3. By employing a bundled transmission set, a likelihood of successful transmission can be increased even in scenarios of poor conditions of communicating on the radio link. Thereby, the coverage of the cellular network can be significantly enhanced—even for low transmission powers as envisioned within the MTC and NB-IoT domain. This facilitates the CE technology.

Typically, the number of messages including data encoded according to a given redundancy version is preconfigured by a bundling policy. The bundling policy may be chosen according to certain properties of the radio link and/or the terminal. The bundling policy may be (semi-)persistently employed for a certain time duration.

However, such techniques face certain restrictions and drawbacks. In particular, where a comparably static bundling policy is employed, it is sometimes possible that either too few or too many messages including data encoded according to a given redundancy version are communicated; this may result either in loss of data or unjustified occupation of resources on the radio link. Hence, the overall quality of service (QoS) is degraded.

SUMMARY

Therefore, a need exists for advanced techniques of communicating messages including data packets according to a given version. In particular, need exists for an advanced CE technology. In particular, a need exists for techniques which enable to flexibly and dynamically adjust the number of messages including data encoded according to a given redundancy version.

This need is met by the features of the independent claims. The dependent claims define embodiments.

According to various embodiments, a node of a cellular network is provided. The node comprises an interface configured to communicate with a terminal attached to the cellular network on a radio link. The node further comprises at least one processor configured to receive, from the terminal and via the interface, a first plurality of payload messages. Each one of the first plurality of payload messages includes a data packet encoded according to a given redundancy version. The at least one processor is configured to decode the data packet based on the first plurality of payload messages. The at least one processor is configured to selectively send, to the terminal and via the interface, at least one control message depending on said decoding. The at least one control message includes a command prompting the terminal to send a second plurality of payload messages. Each one of the second plurality of payload messages includes the data packet encoded according to the given redundancy version.

According to various embodiments, a terminal attachable to a cellular network is provided. The terminal comprises an interface configured to communicate with a node of the cellular network on a radio link. The terminal further comprises at least one processor configured to receive, from the node and via the interface, a first plurality of payload messages. Each one of the first plurality of payload messages includes a data packet encoded according to a given redundancy version. The at least one processor is configured to decode the data packet based on the first plurality of payload messages. The at least one processor is configured to selectively send, to the node and via the interface, at least one control message depending on said decoding. The at least one control message includes a command prompting the node to send a second plurality of payload messages. Each one of the second plurality of payload messages includes the data packet encoded according to the given redundancy version.

According to various embodiments, a terminal is provided. The terminal comprises an interface configured to communicate with a node of a cellular network on the radio link. The terminal further comprises at least one processor configured to send, to the node in via the interface, a first plurality of payload messages. Each one of the first plurality of payload messages includes a data packet encoded according to a given redundancy version. The at least one processor is configured to receive, from the node and via the interface, at least one control message. The at least one control message includes a command prompting to send the second plurality of payload messages. Each one of the second plurality of payload messages includes the data packet encoded according to the given redundancy version.

According to various embodiments, a node of a cellular network is provided. The node comprises an interface configured to communicate with a terminal attached to the cellular network on the radio link. The node further comprises at least one processor configured to send, to the terminal in via the interface, a first plurality of payload messages. Each one of the first plurality of payload messages includes a data packet encoded according to a given redundancy version. The at least one processor is configured to receive, from the terminal and via the interface, at least one control message. The at least one control message includes a command prompting to send the second plurality of payload messages. Each one of the second plurality of payload messages includes the data packet encoded according to the given redundancy version.

According to various embodiments, a method is provided. The method comprises receiving, e.g., from a terminal attached to a cellular network, a first plurality of payload messages on a radio link. Each one of the first plurality of payload messages includes a data packet encoded according to a given redundancy version. The method further comprises decoding the data packet based on the first plurality of payload messages. The method further comprises, depending on said decoding: selectively sending, e.g., to the terminal, at least one control message on the radio link. The at least one control message includes a command prompting the terminal to send a second plurality of payload messages. Each one of the second plurality of payload messages includes the data packet encoded according to the given redundancy version.

According to various embodiments, a computer program product is provided. The computer program product comprises program code to be executed by at least one processor. Executing the program code causes the at least one processor to perform a method. The method comprises receiving, e.g., from a terminal attached to a cellular network, a first plurality of payload messages on a radio link. Each one of the first plurality of payload messages includes a data packet encoded according to a given redundancy version. The method further comprises decoding the data packet based on the first plurality of payload messages. The method further comprises, depending on said decoding: selectively sending, e.g., to the terminal, at least one control message on the radio link. The at least one control message includes a command prompting the terminal to send a second plurality of payload messages. Each one of the second plurality of payload messages includes the data packet encoded according to the given redundancy version.

According to various embodiments, a method is provided. The method comprises sending, e.g., to a node of a cellular network, a first plurality of payload messages on the radio link. Each one of the first plurality of payload messages includes a data packet encoded according to a given redundancy version. The method further comprises receiving, e.g., from the node, at least one control message on a radio link. The at least one control message includes a command prompting to send a second plurality of payload messages. Each one of the second plurality of payload messages includes the data packet encoded according to a given redundancy version. The method further comprises, in response to receiving the at least one control message: sending, e.g., to the node, the second plurality of payload messages.

According to various embodiments, a computer program product is provided. The computer program product comprises program code to be executed by at least one processor. Executing the program code causes the at least one processor to perform a method. The method comprises sending, e.g., to a node of a cellular network, a first plurality of payload messages on the radio link. Each one of the first plurality of payload messages includes a data packet encoded according to a given redundancy version. The method further comprises receiving, e.g., from the node, at least one control message on a radio link. The at least one control message includes a command prompting to send a second plurality of payload messages. Each one of the second plurality of payload messages includes the data packet encoded according to a given redundancy version. The method further comprises, in response to receiving the at least one control message: sending, e.g., to the node, the second plurality of payload messages.

According to various embodiments, a node of a cellular network is provided. The node comprises an interface configured to communicate with a terminal attached to the cellular network on the radio link. The node comprises at least one processor configured to receive, from the terminal and via the interface, a plurality of payload messages. Each one of the plurality of payload messages includes a data packet encoded according to a given redundancy version. The at least one processor is configured to decode the data packet based on the plurality of payload messages. The at least one processor is configured to selectively send, to the terminal and via the interface, at least one control message depending on said decoding. The at least one control message includes a command prompting the terminal to abort sending of payload messages including the data packet.

According to various embodiments, a terminal attachable to a cellular network is provided. The terminal comprises an interface configured to communicate with a node of the cellular network on the radio link. The terminal comprises at least one processor configured to receive, from the node and via the interface, a plurality of payload messages. Each one of the plurality of payload messages includes a data packet encoded according to a given redundancy version. The at least one processor is configured to decode the data packet based on the plurality of payload messages. The at least one processor is configured to selectively send, to the node and via the interface, at least one control message depending on said decoding. The at least one control message includes a command prompting the node to abort sending of payload messages including the data packet. According to various embodiments, a terminal is provided. The terminal comprises an interface configured to communicate with a node of a cellular network on a radio link. The terminal comprises at least one processor configured to send, to the node and via the interface, a plurality of payload messages. Each one of the plurality of payload messages includes a data packet encoded according to a given redundancy version. The at least one processor is configured to receive, from the node in via the interface, at least one control message. The at least one control message includes a command prompting to abort sending of payload messages including the data packet. The at least one processor is further configured to abort sending of payload messages including the data packet in response to receiving the at least one control message.

According to various embodiments, a node of a cellular network is provided. The node comprises an interface configured to communicate with a terminal attached to the cellular network on a radio link. The node comprises at least one processor configured to send, to the terminal and via the interface, a plurality of payload messages. Each one of the plurality of payload messages includes a data packet encoded according to a given redundancy version. The at least one processor is configured to receive, from the terminal in via the interface, at least one control message. The at least one control message includes a command prompting to abort sending of payload messages including the data packet. The at least one processor is further configured to abort sending of payload messages including the data packet in response to receiving the at least one control message.

According to various embodiments, a method is provided. The method comprises receiving, e.g., from a terminal, a plurality of payload messages on a radio link. Each one of the plurality of payload messages includes a data packet encoded according to a given redundancy version. The method further comprises decoding the data packet based on the plurality of payload messages. The method further comprises, depending on said decoding: selectively sending, e.g., to the terminal, at least one control message on the radio link. The at least one control message includes a command prompting to abort sending of payload messages including the data packet.

According to various embodiments, a computer program product is provided. The computer program product comprises program code to be executed by at least one processor. Executing the program code causes the at least one processor to perform a method. The method comprises receiving, e.g., from a terminal, a plurality of payload messages on a radio link. Each one of the plurality of payload messages includes a data packet encoded according to a given redundancy version. The method further comprises decoding the data packet based on the plurality of payload messages. The method further comprises, depending on said decoding: selectively sending, e.g., to the terminal, at least one control message on the radio link. The at least one control message includes a command prompting to abort sending of payload messages including the data packet.

According to various embodiments, a method is provided. The method comprises sending, e.g., to a node of a cellular network, a plurality of payload messages on a radio link. Each one of the plurality of payload messages includes a data packet encoded according to a given redundancy version. The method further comprises receiving, e.g., from the node, at least one control message on the radio link. The at least one control message includes a command prompting to abort sending of payload messages including the data packet. The method further comprises in response to receiving the at least one control message: aborting sending of payload messages including the data packet.

According to various embodiments, a computer program product is provided. The computer program product comprises program code to be executed by at least one processor. Executing the program code causes the at least one processor to perform a method. The method comprises sending, e.g., to a node of a cellular network, a plurality of payload messages on a radio link. Each one of the plurality of payload messages includes a data packet encoded according to a given redundancy version. The method further comprises receiving, e.g., from the node, at least one control message on the radio link. The at least one control message includes a command prompting to abort sending of payload messages including the data packet. The method further comprises in response to receiving the at least one control message: aborting sending of payload messages including the data packet.

According to various embodiments, a terminal is provided. The terminal comprises an interface configured to communicate with a node of a cellular network on a radio link. The terminal further comprises at least one processor configured to negotiate, via the interface with the node, a bundling policy. The bundling policy indicates a default number of messages including data encoded according to the same redundancy version. The at least one processor is further configured to send, via the interface to the node, a plurality of messages under the bundling policy. Each one of the plurality of messages includes data encoded according to a given redundancy version. The number of the plurality of messages is smaller than the default number of messages.

According to various embodiments, a node of a cellular network is provided. The node comprises an interface configured to communicate with a terminal attached to the cellular network on a radio link. The node further comprises at least one processor configured to negotiate, via the interface with the terminal, a bundling policy. The bundling policy indicates a default number of messages including data encoded according to the same redundancy version. The at least one processor is further configured to send, via the interface to the terminal, a plurality of messages under the bundling policy. Each one of the plurality of messages includes data encoded according to a given redundancy version. The number of the plurality of messages is smaller than the default number of messages.

According to various embodiments, a node of a cellular network is provided. The node comprises an interface configured to communicate with a terminal attached to the cellular network on the radio link. The node further comprises at least one processor configured to negotiate, via the interface with the terminal, a bundling policy. The bundling policy indicates a default number of messages including data encoded according to the same redundancy version. The at least one processor is further configured to receive, via the interface from the terminal, a plurality of messages under the bundling policy. Each one of the plurality of messages includes data encoded according to a given redundancy version. The number of the plurality of messages is smaller than the default number of messages. The at least one processor is configured to decode the data based on the plurality of messages.

According to various embodiments, a terminal attachable to a cellular network is provided. The terminal comprises an interface configured to communicate with a node of the cellular network on the radio link. The terminal further comprises at least one processor configured to negotiate, via the interface with the node, a bundling policy. The bundling policy indicates a default number of messages including data encoded according to the same redundancy version. The at least one processor is further configured to receive, via the interface from the node, a plurality of messages under the bundling policy. Each one of the plurality of messages includes data encoded according to a given redundancy version. The number of the plurality of messages is smaller than the default number of messages. The at least one processor is configured to decode the data based on the plurality of messages.

According to various embodiments, a method is provided. The method comprises negotiating, e.g., with a node of a cellular network, a bundling policy on the radio link. The bundling policy indicates a default number of messages including data encoded according to the same redundancy version. The method further comprises sending, e.g., to the node, a plurality of messages under the bundling policy and on the radio link. Each one of the plurality of messages includes data encoded according to a given redundancy version. The number of the plurality of messages is smaller than the default number of messages.

According to various embodiments, a computer program product is provided. The computer program product comprises program code to be executed by at least one processor. Executing the program code causes the at least one processor to perform a method. The method comprises negotiating, e.g., with a node of a cellular network, a bundling policy on the radio link. The bundling policy indicates a default number of messages including data encoded according to the same redundancy version. The method further comprises sending, e.g., to the node, a plurality of messages under the bundling policy and on the radio link. Each one of the plurality of messages includes data encoded according to a given redundancy version. The number of the plurality of messages is smaller than the default number of messages.

According to various embodiments, a method is provided. The method comprises negotiating, e.g., with a terminal, a bundling policy on the radio link. The bundling policy indicates a default number of messages including data encoded according to the same redundancy version. The method further comprises receiving, e.g., from the terminal, a plurality of messages under the bundling policy and on the radio link. Each one of the plurality of messages includes data encoded according to a given redundancy version. The number of the plurality of messages is smaller than the default number of messages. The method further comprises decoding the data based on the plurality of messages.

According to various embodiments, a computer program product is provided. The computer program product comprises program code to be executed by at least one processor. Executing the program code causes the at least one processor to perform a method. The method comprises negotiating, e.g., with a terminal, a bundling policy on the radio link. The bundling policy indicates a default number of messages including data encoded according to the same redundancy version. The method further comprises receiving, e.g., from the terminal, a plurality of messages under the bundling policy and on the radio link. Each one of the plurality of messages includes data encoded according to a given redundancy version. The number of the plurality of messages is smaller than the default number of messages. The method further comprises decoding the data based on the plurality of messages.

Above, various embodiments have been disclosed with respect to payload messages. Respective scenarios may be readily implemented for other kinds of messages, e.g., control messages including a command encoded according to a given redundancy version.

Above, various embodiments have been disclosed with respect to either UL or DL communication. Respective scenarios may be readily implemented for UL and DL, respectively.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
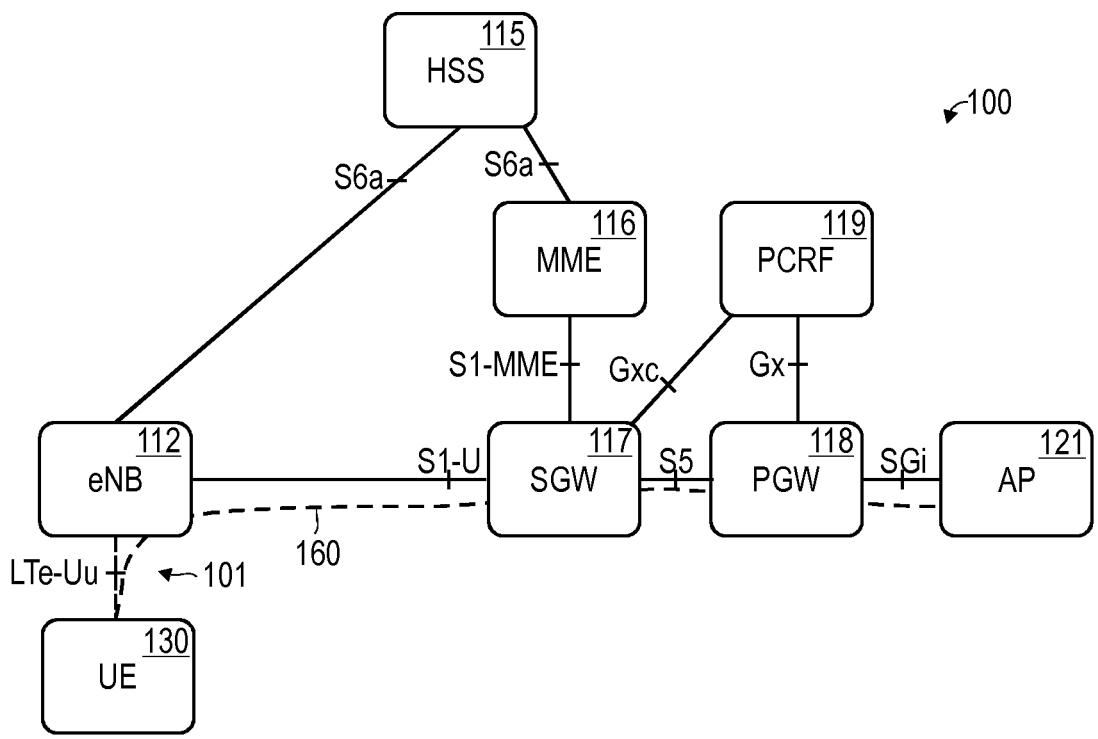
FIG. 1 is a schematic illustration of a cellular network to which a terminal is attached via a radio link.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of communicating messages on a radio link between a node of a cellular network and a terminal are disclosed. The messages may be payload messages including a data packet, the data packet including a higher-layer user data of an application; the messages may be control messages comprising commands to be executed by the corresponding receiver or including information for the corresponding receiver. The techniques disclosed herein may be applicable to UL direction and DL direction.

The techniques disclosed herein correspond to scenarios where data, i.e., data packets and/or commands, is redundantly communicated using a plurality of messages. Hence, each one of the plurality of messages includes data encoded according to a given redundancy version. Hence, the same encoded version of the data is redundantly communicated a number of times.

Decoding of the data encoded according to a given redundancy version can be based on all redundantly communicated messages. Thus, by aggregating the received information across the received messages, the probability of successfully decoding the data increases.

Such techniques may find particular application in the framework of the CE technology, e.g., where terminals in the MTC domain or the NB-IoT domain implement a comparably low transmit power, but due to redundant transmission of the same encoded version of the data a sufficiently high likelihood of successfully receiving the data is ensured.

According to the techniques disclosed herein, a flexible and dynamic adaptation of properties of redundantly communicating the given redundancy version of data becomes possible. E.g., the trade-off situation between occupation of resources on the radio channel on the one hand side, and a sufficiently low communication failure rate on the other hand side may be optimized by flexibly and dynamically setting the number of messages including data that is encoded according to a given redundancy version. E.g., if it is determined that the probability of successfully decoding data is too low (sufficiently high), the number of messages including data that is encoded according to the given redundancy version may be flexibly and dynamically increased (decreased). Thereby, resources on the radio channel are not statically blocked even if the quality of communicating on the radio link allows for a smaller number of messages including data that is encoded according to the given redundancy version.

The techniques disclosed herein may rely on logic that is fully or partly implemented at the network-side of the cellular network, e.g., at an access node of the cellular network communicating with the terminal on the radio link. Alternatively or additionally, the techniques disclosed herein may rely on logic that is fully or partly implemented at the terminal-side, e.g., at the terminal attached to the cellular network via the access node.

In a first example, the access node (or the terminal) receives a number of messages including data encoded according to a given redundancy version. In such a situation, where the access node (or the terminal) judges that—e.g., due to a sufficiently low bit error rate (BER)—a number of further transmissions of the given redundancy version of the data would likely enable to successfully decode the data, the access node (or the terminal) sends a corresponding control message including a command prompting the terminal (or the access node) to send further messages including the data encoded according to the given redundancy version. If compared to reference implementations of a conventional NACK, instead of requesting transmission of a different, further redundancy version, here a number of further messages including the same initial redundancy version may be requested. Thus, the number of redundantly communicated messages is increased.

In a second example, where the access node (or the terminal) judges that decoding of data based on a plurality of messages which each include the data encoded according to the given redundancy version has already been successful, a fast acknowledgment message can be sent to the terminal (or the access node). The fast acknowledgment message corresponds to control message including a command prompting the terminal (or the access node) to abort sending of messages including the data. Thus, in such examples it is possible to preemptively abort communication of messages including the given redundancy version of data even before a corresponding bundled transmission set has been completed.

In a third example, the terminal (or the access node) judges that—e.g., depending on the quality of communicating on the radio link—a default number of messages defined by a bundling policy is too large or too small. Then, the terminal (or the access node) may flexibly deviate from the default number of messages defined by the bundling policy and send a smaller or larger number of messages including data encoded according to the same redundancy version.

Such techniques of adapting properties of redundantly communicating the given redundancy version of data as outlined above according to the first, second, and third examples may be the combined with each other.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a radio link 101 between a terminal 130 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EG-PRS), Universal Mobile Telecommunications System (UMTS), and High Speed Packet Access (HSPA), and corresponding architectures of associated cellular networks.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally.

The 3GPP LTE RAT implements a HARQ protocol. The HARQ protects data communicated via the radio link 101. FEC and retransmission are employed in this respect.

The terminal 130 is connected via the radio link 101 to an access node 112 of the cellular network 100. The access node 112 and the terminal 130 implement the evolved UMTS terrestrial radio access technology (E-UTRAN); therefore, the access point node 112 is an eNB 112.

E.g., the terminal 130 may be selected from the group comprising: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. E.g., the IoT device may be connected to the EPS via the NB-IoT RAT.

Figure 2:
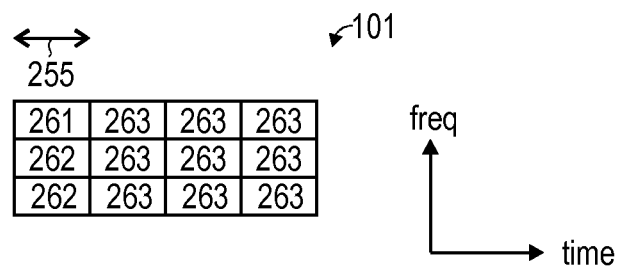
FIG. 2 schematically illustrates a plurality of channels implemented on the radio link.

Communication on the radio link 101 can be in UL and/or DL direction. Details of the radio link 101 are illustrated in FIG. 2. The radio link 101 implements a plurality of communication channels 261-263. Transmission frames 255 of the channels 261-263 occupy a certain time duration. Each channel 261—263 comprises a plurality of resource blocks which are defined in time domain and frequency domain.

E.g., a first channel 261 may carry synchronization signals which enable the eNB 112 and the terminal 130 to synchronize communication on the radio link 101 via the communication channel 250 in time domain.

A second channel 262 may be associated with control messages (control channel 262). The control messages may configure operation of the terminal 130, the eNB 112, and/or the radio link 101. E.g., radio resource control (RRC) messages and/or HARQ ACKs and NACKs can be exchanged via the control channel. According to the E-UTRAN RAT, the control channel 262 may thus correspond to a Physical Downlink Control Channel (PDCCH) and/or a Physical Uplink Control Channel (PUCCH) and/or a Physical Hybrid ARQ indicator Channel (PHICH).

Further, a third channel 263 is associated with a payload messages carrying higher-layer user-plane data packets associated with a given service implemented by the terminal 130 and the eNB 112 (payload channel 263). According to the E-UTRAN RAT, the payload channel 263 may be a Physical Downlink Shared Channel (PDSCH) or a Physical Uplink Shared Channel (PUSCH).

Turning again to FIG. 1, the eNB 112 is connected with a gateway node implemented by a serving Gateway (SGW) 117. The SGW 117 may route and forward payload data and may act as a mobility anchor during handovers of the terminal 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the terminal 130 to seek access to the packet data network.

The PGW 118 can be an endpoint of an end-to-end connection 160 for packetized payload data of the terminal 130. The end-to-end connection 160 may be used for communicating data of a particular service. Different services may use different end-to-end connections 160 or may share, at least partly, a certain end-to-end connection.

Figure 3:
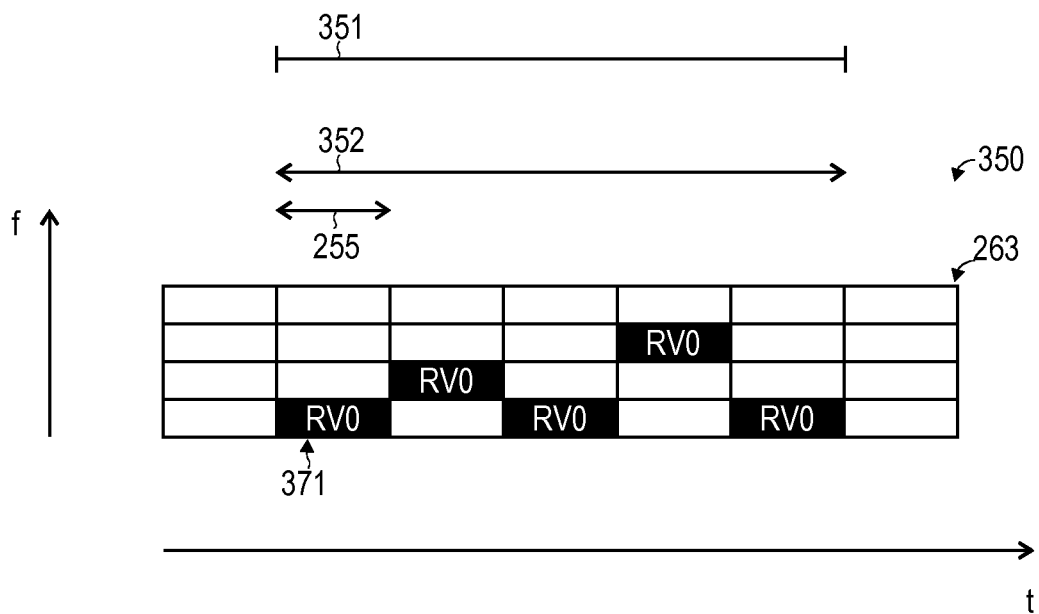
FIG. 3 schematically illustrates a bundling policy specifying a bundled transmission set of messages communicated in subsequent transmission intervals of the channel implemented on the radio link, wherein each one of the messages includes data encoded according to a given redundancy version.

The end-to-end connection 160 may be implemented by one or more bearers which are used to communicate service-specific data. An EPS bearer which is characterized by a certain set of quality of service parameters indicated by the QoS class identifier (QCI). FIG. 3 illustrates aspects of a bundling policy 350. The bundling policy 350 corresponds to communicating messages including data encoded according to a given redundancy version as a bundled transmission set. In particular, FIG. 3 illustrates payload messages communicated via the payload channel 263. The payload messages include a data packet encoded according to a first redundancy version 371 (labeled RV0 in FIG. 3). As can be seen from FIG. 3, the messages are contiguously communicated in subsequent subframes 255 of the channel 263, thereby implementing the bundled transmission set 351. The bundled transmission set 351 has a certain duration 352 which is defined by and end where the last copy of the data packet is communicated. The duration 352 of the bundled transmission set 351 corresponds to a default number of messages which include data encoded according to a given redundancy version, e.g., in the example of FIG. 3 a default number of five messages. Hence, the bundling policy 350 may specify a default number of "blind" repetitions of data. The bundling policy 350 may explicitly or implicitly specify the default number of messages.

While in FIG. 3 a scenario is shown where the bundled transmission set 351 comprises the messages in subsequent subframes 255, in other examples it is also possible that the messages comprising the given redundancy version of the data packet are arranged non-contiguously, i.e., with intermittent subframes 255 not carrying the messages.

The specific time-frequency arrangement of the messages as illustrated in FIG. 3 is an example only. Other examples are conceivable.

While in FIG. 3 a scenario is shown where payload messages are communicated, similar techniques may be readily applied to other kinds and types of messages, e.g., control messages.

Figure 4:
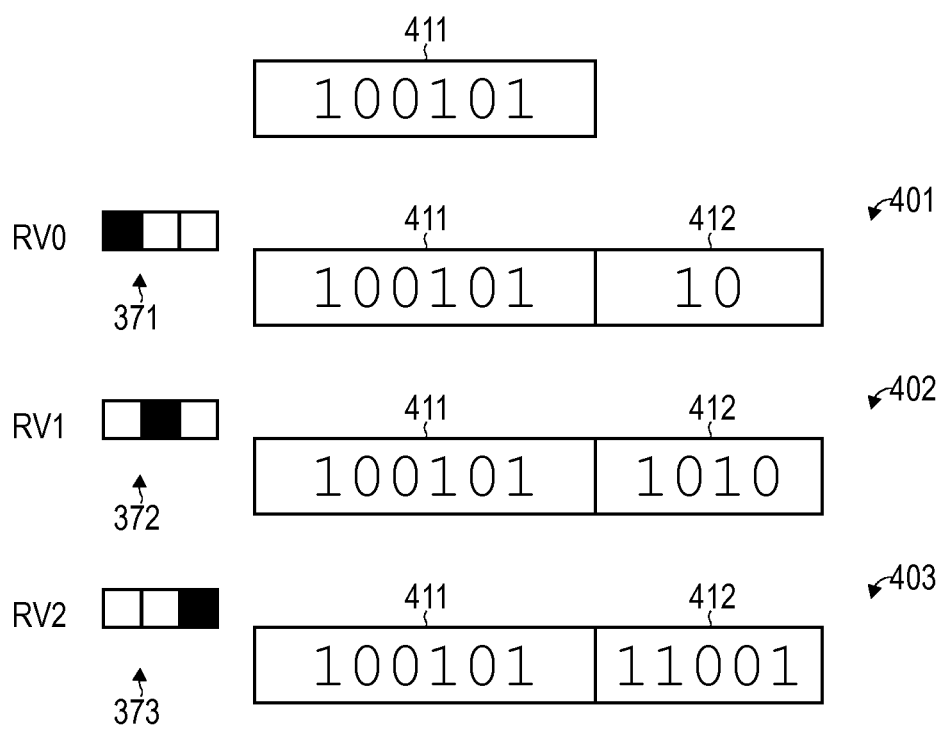
FIG. 4 schematically illustrates messages including data encoded according to different redundancy versions.

FIG. 4 illustrates aspects of encoding data 411 according to different redundancy versions 371-373. As can be seen from FIG. 4, the data 411 comprises a sequence of bits. E.g., the data 411 can be a data packet, e.g., a MAC layer Service Data Unit (SDU). It would also be possible that the data 411 corresponds to a RRC command or other control data such as a ACK, NACK, UL grant, or DL assignment.

Encoding the data 411 can correspond to adding a checksum 412 to the data 411. Different techniques of encoding can be employed such as, e.g., Reed Solomon encoding, turbo convolutional encoding, convolutional coding, etc. Provisioning the checksum 412 can facilitate reconstruction of corrupted bits of the corresponding message 401-403 according to the coding scheme. Typically, the longer (shorter) the checksum 412, the more (less) robust the communication of the corresponding message 401-403 against noise and channel imperfections; thus, a probability for successfully receiving the data 411 can be tailored by the length of the checksum. Alternatively or additionally, encoding the data can correspond to applying interleaving where the bits of the data 411 are shuffled (not shown in FIG. 4).

Typically, different redundancy versions 371-373 correspond to checksums 412 of different length (as illustrated in FIG. 4). In other examples, it would also be possible that different redundancy version 371-373 employ checksums 412 of the same length, but encoded according to the different coding scheme. Alternatively or additionally, different redundancy versions may employ different interleaving schemes. Alternatively or additionally, different redundancy versions may employ different puncturing schemes.

Hereinafter, an example implementation of constructing different redundancy versions is given.

STEP 1 of constructing different redundancy versions: A block of information bits, i.e., the data 411 to be transmitted, is encoded. Here, additional redundancy bits are generated, i.e., in addition to the data 411. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

It is generally possible to implement bundled transmission sets 351 using redundant transmissions of messages including data encoded according to a given redundancy version 371-373 for payload messages and control messages.

Figure 5:
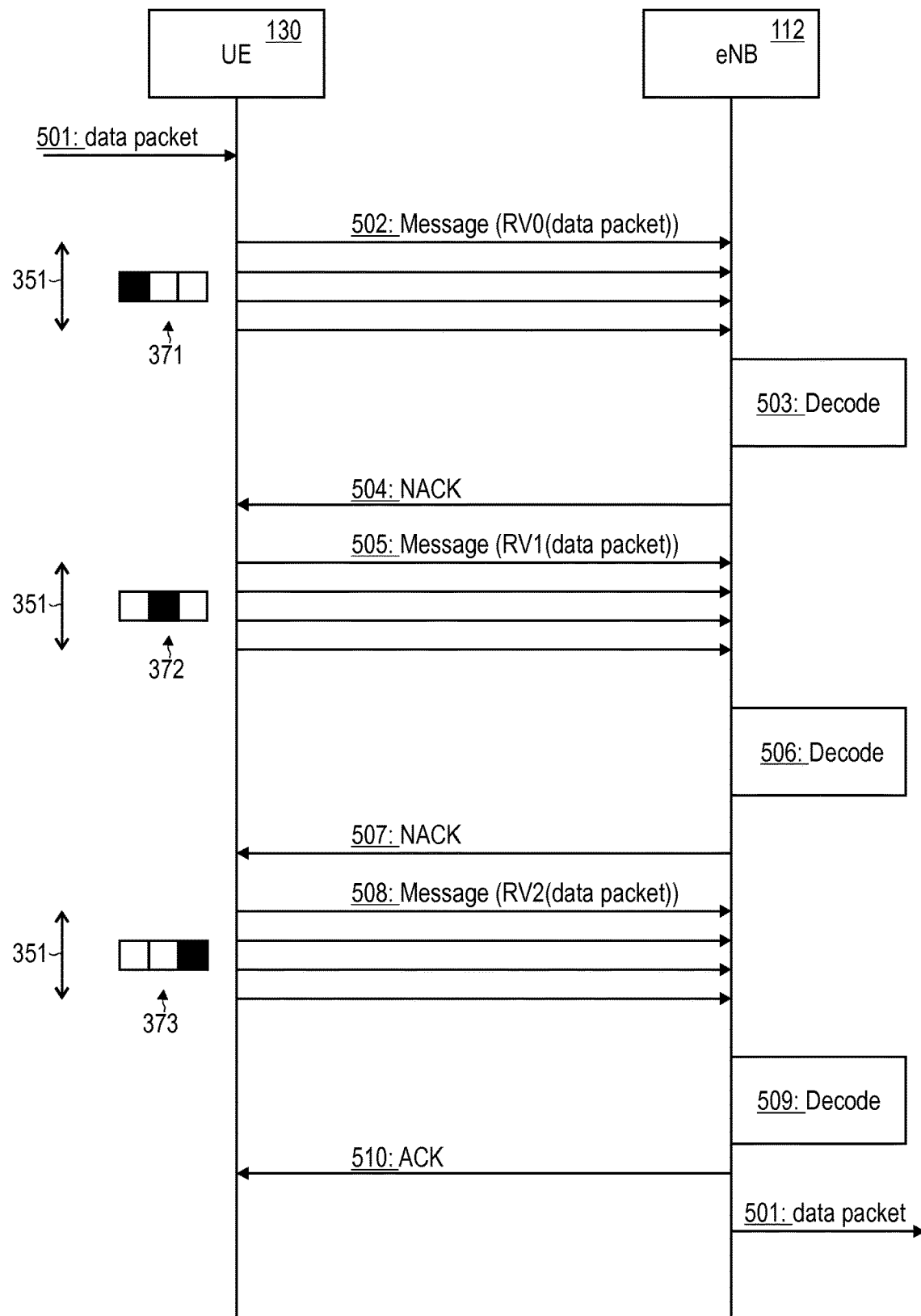
FIG. 5 is a signaling diagram of communicating bundled transmission sets comprising payload messages employing a HARQ technique according to reference implementations.

FIG. 5 illustrates aspects of the HARQ protocol implemented by the MAC layer of a communication protocol stack of the terminal 130 and the eNB 112, respectively. The HARQ protocol according to the example of FIG. 5 employs bundled transmission sets of payload messages 502, 505, 508 within the CE technology.

In detail, first a higher-layer data packet 501 is received, e.g., in a transmit buffer implemented by the terminal 130. Then, a payload message 502 comprising a first redundancy version 371 of the data packet 501 is transmitted as a bundled transmission set 351 by the terminal 130 to the eNB 112 a plurality of times (the bundled transmission set 351 is illustrated by the multiple parallel arrows in FIG. 5).

Once communication of the plurality of payload messages 502 of the bundled transmission set 351 has ended, the eNB 112 attempts to decode the data packet 501. Decoding 503 is based on all payload messages 502 of the bundled transmission set 351 to increase the probability of successfully decoding the data packet 501. In the example of FIG. 5, decoding at 503 fails and, consequently, the eNB 112 sends a NACK 504 to the terminal 130. The terminal 130 receives the NACK 504 and sends a plurality of payload messages 505 comprising the second redundancy version 372 of the data packet 501; also the payload messages 505 are sent as a bundled transmission set 351.

Once the bundled transmission set 351 comprising the plurality of payload messages 505 has ended, the eNB 112 attempts to decode the data packet 501, see 506. Decoding at 506 is based on all payload messages 505 of the bundled transmission set 351 to increase the probability of successfully decoding the data packet 501. In the example of FIG. 5, decoding at 506 fails and, consequently, the eNB 112 sends a NACK 507 to the terminal 130. The terminal 130 receives the NACK 507 and sends payload messages 508 comprising a third redundancy version 373 of the data packet 501; also the payload messages 508 are sent as a bundled transmission set 351.

Once the bundled transmission set 351 comprising the plurality of payload messages 508 has ended, the eNB 112 attempts to decode the data packet 501, 509. Decoding at 509 is based on all payload messages 508 of the bundled transmission set 351 to increase the likelihood looks of successfully decoding the data packet 501. In the example of FIG. 5, decoding at 509 is successful and consequently the eNB 112 sends an ACK 510 to the terminal 130. Also, the data packet 501, now successfully decoded, is released upper layers of the communication protocol stack of the eNB 112.

FIG. 5 is an example of communication in UL direction. Similar techniques may be readily applied for communication in DL direction.

In the example of FIG. 5, only the payload messages 502, 505, 508 have been transmitted as part of bundled transmission sets 351, i.e., have been redundantly transmitted a number of times using a given redundancy version 371-373. Alternatively or additionally, it is also possible to communicate control messages such as the NACKs 504, 507 and/or the ACK 510 a plurality of times as a bundled transmission set 351.

Figure 6:
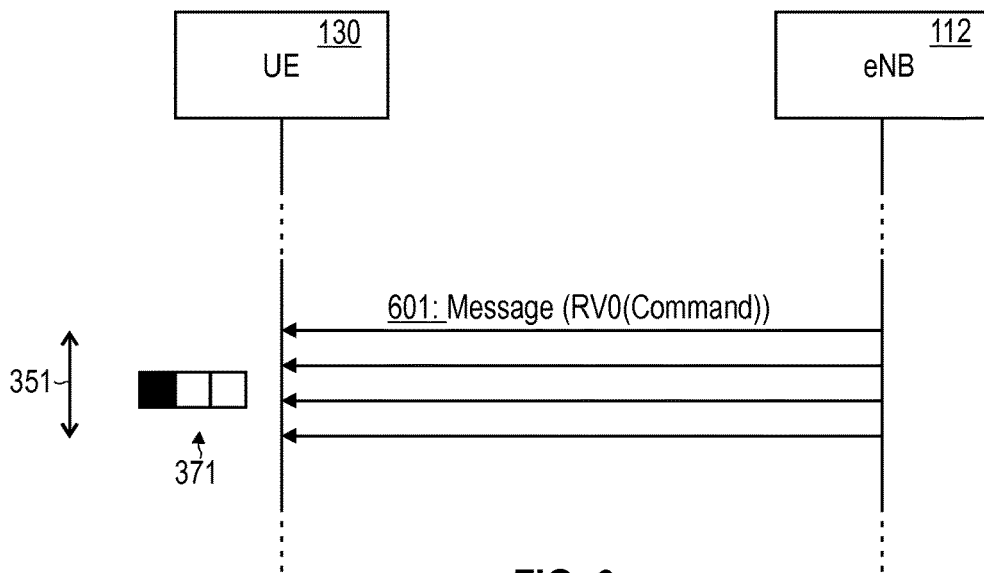
FIG. 6 is a signaling diagram of a bundled transmission set comprising a control message according to reference implementations.

FIG. 6 illustrates aspects of communicating a control message 601 a plurality of times as part of a bundled transmission set 351. Here, a respective command may be encoded according to a given redundancy version (in the example of FIG. 6, the first redundancy version 371).

FIG. 6 is an example of communication in UL direction. Similar techniques may be readily applied for communication in DL direction.

Techniques of communicating control messages 601 a plurality of times as part of a bundled transmission set 351 may be employed in the various examples disclosed herein (even if not specifically mentioned).

Figure 7:
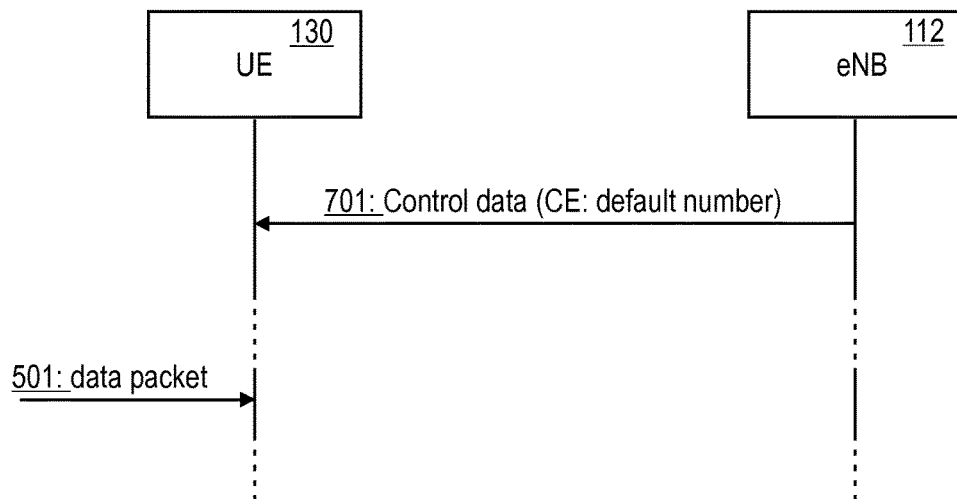
FIG. 7 is a signaling diagram of negotiating a bundling policy according to various embodiments, wherein the bundling policy specifies a default number of messages used for communication of data according to the same redundancy version.

FIG. 7 illustrates aspects of negotiating a bundling policy 350 under which messages of a bundled transmission set 351 are communicated. In the scenario of FIG. 7, dedicated control signaling 701 is implemented between the eNB 112 and the terminal 130. The control signaling 701 may be implemented, e.g., based on RRC signaling. The control signaling 701 may be executed during an attach phase where the terminal 130 attaches to the eNB 112. Generally, it is possible that the control signaling 701 is executed before the data packet 501 arrives in the transmit buffer of the terminal 130.

While FIG. 7 illustrates a scenario where the bundling policy 350 is negotiated between the terminal 130 and the eNB 112 by means of the eNB 112 assigning a certain default number of messages including data encoded according to the same redundancy version 371-373, in other scenarios said negotiating can also comprise control signaling from the terminal 130 to the eNB 112. In other words, it is possible that the logic for determining certain parameters of the bundling policy is implemented at the eNB 112 and/or the terminal 130.

Figure 8A:
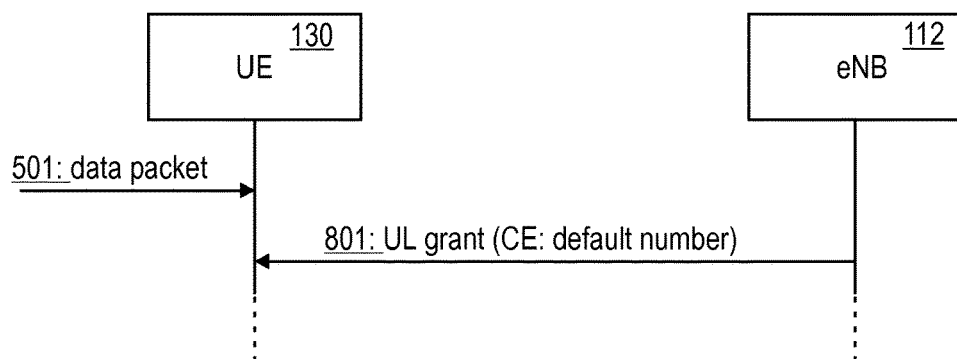
FIG. 8A is a signaling diagram of negotiating a bundling policy according to various embodiments, wherein the bundling policy specifies a default number of messages used for communication of data according to the same redundancy version.

FIG. 8A illustrates aspects of negotiating a bundling policy 350 under which messages of a bundled transmission set 351 are communicated. In the scenario of FIG. 8A, said negotiating is piggybacked onto existing control signaling 801, i.e., in the non-limiting example of FIG. 8A onto an UL grant. E.g., a respective indicator may explicitly indicate the new default number of messages according to the bundling policy 350.

Also, in the example of FIG. 8A, the properties of the bundling policy, in the scenario of FIG. 8A, are negotiated in response to the data packet 501 arriving at the transmit buffer of the terminal 130.

Figure 8B:
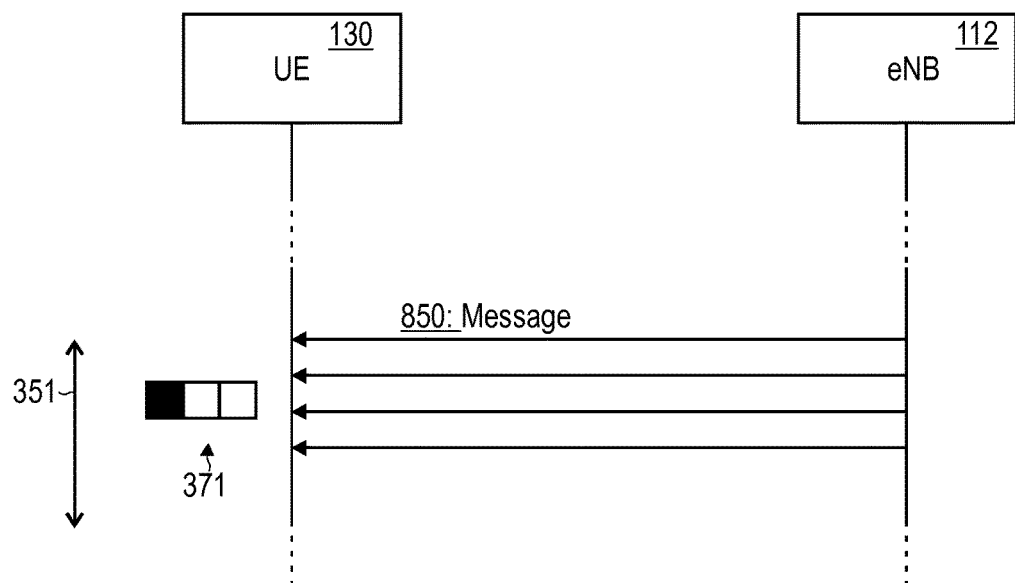
FIG. 8B is a signaling diagram of negotiating a bundling policy according to various embodiments, wherein the bundling policy specifies a default number of messages used for communication of data according to the same redundancy version.

FIG. 8B aspects of negotiating a bundling policy 350 under which messages of a bundled transmission set 351 are communicated. In the scenario of FIG. 8A, said negotiating is piggybacked onto existing signaling 850. In FIG. 8B, a new default number of messages is implicitly signaled. In particular, the number of messages 850 is smaller than the previously valid default number (as illustrated in FIG. 8B by the messages 850 not extending to the end of the bundled transmission set 351). This implicitly indicates the new default number.

As can be seen from FIGS. 7 and 8A, 8B, a wide variety of potential techniques of implementing negotiating of the bundling policy between the terminal 130 and the eNB 112 exists. In particular, said negotiating may vary in terms of where the respective logic is situated (i.e., at the terminal 130 and/or the eNB 112), a direction of corresponding control signaling 701, 801, a trigger criterion for respective control signaling 701, 801, etc. Combinations of the techniques of negotiating the bundling policy 350 as illustrated by FIGS. 7, 8A, and 8B are conceivable.

The various techniques of negotiating the bundling policy 350 as illustrated by FIGS. 7, 8A, and 8B may be employed in the various examples disclosed herein (even if not specifically mentioned).

Where a bundling policy 350 has been negotiated—e.g., as illustrated by the examples of FIGS. 7 and 8A and 8B—according to reference implementations, certain properties of the bundling policy are adapted comparably statically and time-persistently by the terminal 130 and/or the eNB 112. E.g., according to reference implementations, the number of transmissions 901 per bundled transmission set may be specified by the bundling policy and may be statically adapted for communication of messages between the terminal 130 and the eNB 112.

Figure 9:
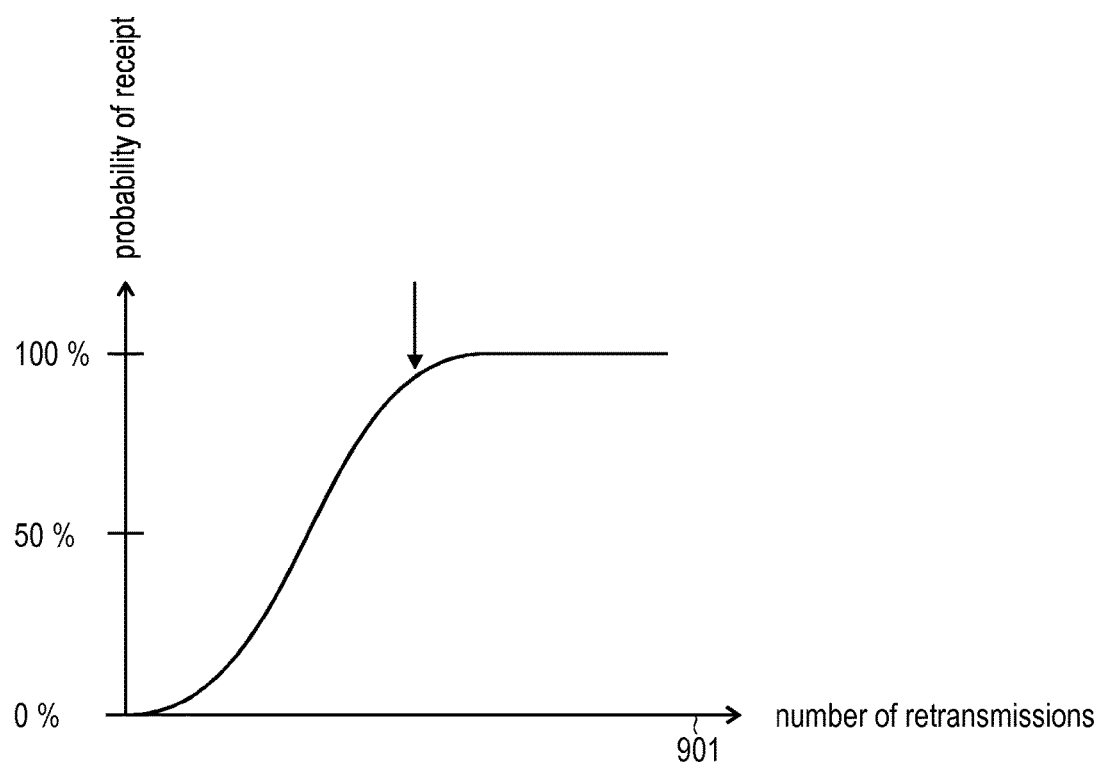
FIG. 9 illustrates a probability of successful receipt of data as a function of the number of messages of a bundled transmission set.

FIG. 9 illustrates aspects of a probability of receipt of data. FIG. 9 schematically plots the probability of successful receipt as a function of the number of transmissions 901. Here, above a certain number of transmissions (illustrated by the vertical arrow in FIG. 9) the probability of successful receipt saturates such that an even larger number of transmission 901 does not add additional benefit in terms of a further increase of the probability of receipt. On the other hand, if the number of transmissions 901 is chosen too small, the probability of successful receipt rapidly drops and the QoS sufferers. The certain number of transmissions where an optimum between probability of receipt end number of transmissions 901 is obtained may be referred to as sweet spot.

Typically, the position of the sweet spot may change for changing communication conditions on the radio link 101. E.g., if the quality of communicating on the radio link 101 drops (increases), the sweet spot may be shifted to a larger (smaller) number of transmissions 901. Such a time-dependent and/or position-dependent behavior of the sweet spot may be conflicting with the statically adjusted bundling policy.

Hereinafter, techniques are disclosed which enable to flexibly and dynamically adjust the number of transmissions 901 in order to optimize the trade-off between the probability of successful receipt of data, on the one hand side, and, on the other hand side, the required number of transmissions 901. Hence, hereinafter, techniques are disclosed which enable to operate close to the sweet spot.

Figure 10:
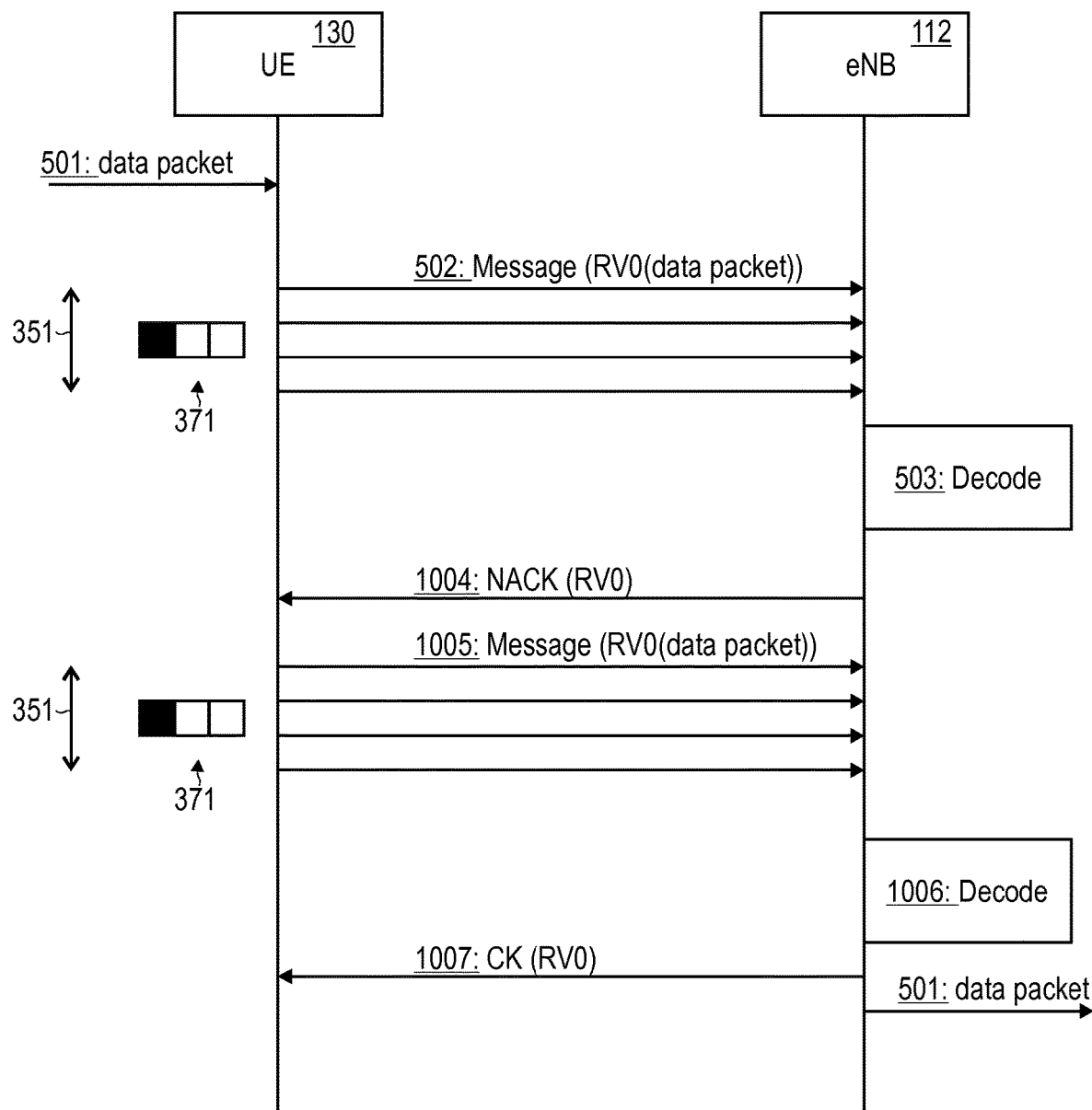
FIG. 10 is a signaling diagram illustrating sending a control message including a command prompting to send second payload messages including a data packet encoded according to a given redundancy version according to various embodiments, wherein previously a first plurality of payload messages has been communicated, each one of the first plurality of payload messages including the data packet encoded according to the given redundancy version.

FIG. 10 illustrates a first example on dynamically and flexibly adjusting the number of transmissions 901 of payload messages 502, 1005 including a data packet 501 encoded according to a given redundancy version 371. In the example of FIG. 10, the terminal 130 sends a first plurality of payload messages 502 on the radio link 101. Each one of the first plurality of payload messages 502 includes the data packet 501 which is encoded according to the first redundancy version 371. The first plurality of payload messages 502 are part of a bundled transmission set 351.

The eNB 112 receives the first plurality of payload messages 502 and decodes the data packet 501 based on the first plurality of payload messages 502, 503. In the example of FIG. 10, decoding at 503 fails and, thus, the eNB 112 sends a control message 1004 to the terminal 130.

While in FIG. 10 for sake of brevity only a single control message 1004 is illustrated, generally, as explained above with respect to FIG. 6, a plurality of control messages comprising a command encoded according to a given redundancy version 371-373 may be sent as part of a bundled transmission set 351. Here, the plurality of control messages may be sent as part of a bundled transmission set 351. This may increase the probability of successful receipt of the command included in the control message 1004.

The control message 1004 includes a command prompting the terminal 130 to send the second plurality of payload messages 1005, each one of the second plurality of payload messages 1005 including the data packet 501 encoded according to the first redundancy version 371.

From a comparison of FIGS. 5 and 10 it follows that in the scenario of FIG. 10—instead of sending the conventional NACK 504 prompting the terminal 130 to send a further plurality of payload messages 505 including the data packet 501 encoded according to the second redundancy version 372 (not shown in FIG. 10)—further copies of the data packet 501 encoded according to the first redundancy version 371 are requested. In the example of FIG. 10, also the control message 1004 is a NACK of the HARQ protocol implemented by the MAC layer of the communication protocol stack of the eNB 112; this is because also the control message 1004, at least implicitly, indicates that decoding at 503 has failed.

By requesting additional copies of the data packet 501 encoded according to the first redundancy version 371 (instead of requesting copies of the data packet 501 encoded according to the second redundancy version 372), it is possible to reduce the overall occupation of the radio link 101. E.g., the number of the second plurality of messages 1005 including the data packet 501 encoded according to the first redundancy version 371 may be smaller than the number of the further plurality of payload messages 505 including the data packet 501 encoded according to the second redundancy version 372. By such techniques, also a latency of communicating the data packet 501 may be reduced.

These techniques are based on the finding that—as a general trend—the receiver typically may require many repetitions of a redundancy version 371-373 for which transmission is newly initiated in order to take benefit of the new redundancy bits included in that newly initiated redundancy version 371-373. However, achieving better demodulation performance of the previously transmitted redundancy version 371-373 may only require a few more repetitions of this previously transmitted redundancy version 371-373 since the receiver has already received a number of repetitions of this previously transmitted redundancy version 371-373.

The terminal 130, in response to receiving the NACK 1004, sends a second plurality of payload messages 1005, each one of the second plurality of payload messages 1005 including the data packet 501 encoded according to the first redundancy version 371. The second plurality of payload messages 1005 are part of a bundled transmission set 351. The eNB 112 then receives the second plurality of payload messages 1005 and decodes the data packet 501 based on the first plurality of payload messages 502 and the second plurality of payload messages 1005, 1006.

In the example of FIG. 10, decoding at 1006 is successful such that the data packet 501 is subsequently released to a higher layers of the communication protocol stack of the eNB 112; an ACK 1007 is sent.

As can be seen from FIG. 10, first, the first plurality of payload messages 502 is sent under the bundling policy and the number of the first plurality of payload messages 502 equals the default number of payload messages according to the bundling policy. However, the sum of the number of the first plurality of payload messages 502 and the number of the second plurality of payload messages 1005 is larger than the default number of payload messages according to the bundling policy. E.g., also the number of the second plurality of payload messages 1005 may equal the default number of may be smaller. Thus, FIG. 10 illustrates a scenario where a need is identified to deviate from the bundling policy, because the decoding at 503 fails. Then, it is possible to flexibly adjust the number of payload messages 502, 1005 including the data packet 501 encoded according to the first redundancy version 371 in order to facilitate successful decoding at 1006.

In some examples, it is possible to subsequently adhere to the larger number of payload messages 502, 1005 including the data packet 501 encoded according to the first redundancy version 371. In this context, it is possible to re-negotiate, between the terminal 130 and the eNB 112, the bundling policy 350. E.g., if the decoding, at 1006, is successful, it can be judged that for future communication the number of payload messages encoding data packets according to the first redundancy version 371 should be set as the sum of the number of the first plurality of payload messages 502 and the number of the second plurality of payload messages 1005. This may be done implicitly by means of the second plurality of payload messages 1005 and/or the NACK 1004 (cf. FIG. 8B).

In some examples, the logic for determining the number of the second plurality of payload messages 1004 may reside fully or partly at the terminal 130. E.g., the terminal 130, in response to receiving the NACK 1004, may determine the number of the second plurality of payload messages 1005 depending on the quality of communicating on the radio link 101. E.g., the terminal 130 may take into account the BER of communicating on the radio link 101.

In further examples, the logic for determining the number of the second plurality of payload messages 1004 may reside fully or partly at the eNB 112. E.g., the eNB 112 may determine the number of the second plurality of payload messages 1005 depending on the quality of communicating on the radio link 101. E.g., the eNB 112 may take into account the BER of communicating on the radio link 101. The eNB 112 may explicitly or implicitly signal the determined number of the second plurality of payload messages 1005, e.g., by means of the NACK 1004. E.g., in some examples, the number of the plurality of NACKs 1004 (in FIG. 10, for sake of brevity only a single NACK 1004 is illustrated) can equal the sum of the number of the first plurality of payload messages 502 and the number of the second plurality of payload messages 1005. Alternatively or additionally, the NACK 1004 can include an indicator indicating the number of the second plurality of payload messages 1005. By such means, it is also possible to instruct the terminal 130 on the new default number of payload messages including a data packet according to a given redundancy version 371-373 when re-negotiating the bundling policy (cf. FIG. 8B).

As explained above, in the scenario of FIG. 10, the control message 1004 is sent by the eNB 112, because the decoding at 503 fails. It is possible to take into account further decision criteria when judging whether or not to send the control message 1004 prompting to send the second plurality of payload messages 1005, each one of the second plurality of payload messages 1005 including the data packet 501 encoded according to the first redundancy version 371. E.g., a further criterion to take into account can be the BER of the first plurality of payload messages 502. E.g., said sending of the control message 1004 can be executed if the BER of communicating on the radio link 101 is below a threshold; here, the BER of the first plurality of payload messages 502 can be considered. Also, instead of considering the BER of the first plurality of payload messages 502, alternatively or additionally, other figure(s) of merit indicative of a quality of communicating on the radio link 101 may be taken into account. Generally, where the quality of communicating on the radio link 101 is not severely degraded, a comparably high likelihood of successfully decoding the data packet 501 based on the first redundancy version 371 of the first plurality of payload messages 502 only exists; then, no need exists to request a higher-order redundancy version 372.

However, where the quality of communicating on the radio link 101 a severely degraded—as may be indicated by a comparably high BER—, it may be feasible to switch to a higher-order redundancy version 372, 373 instead of transmitting further copies of the data packet 501 encoded according to the lower-order redundancy version 371.

Figure 11:
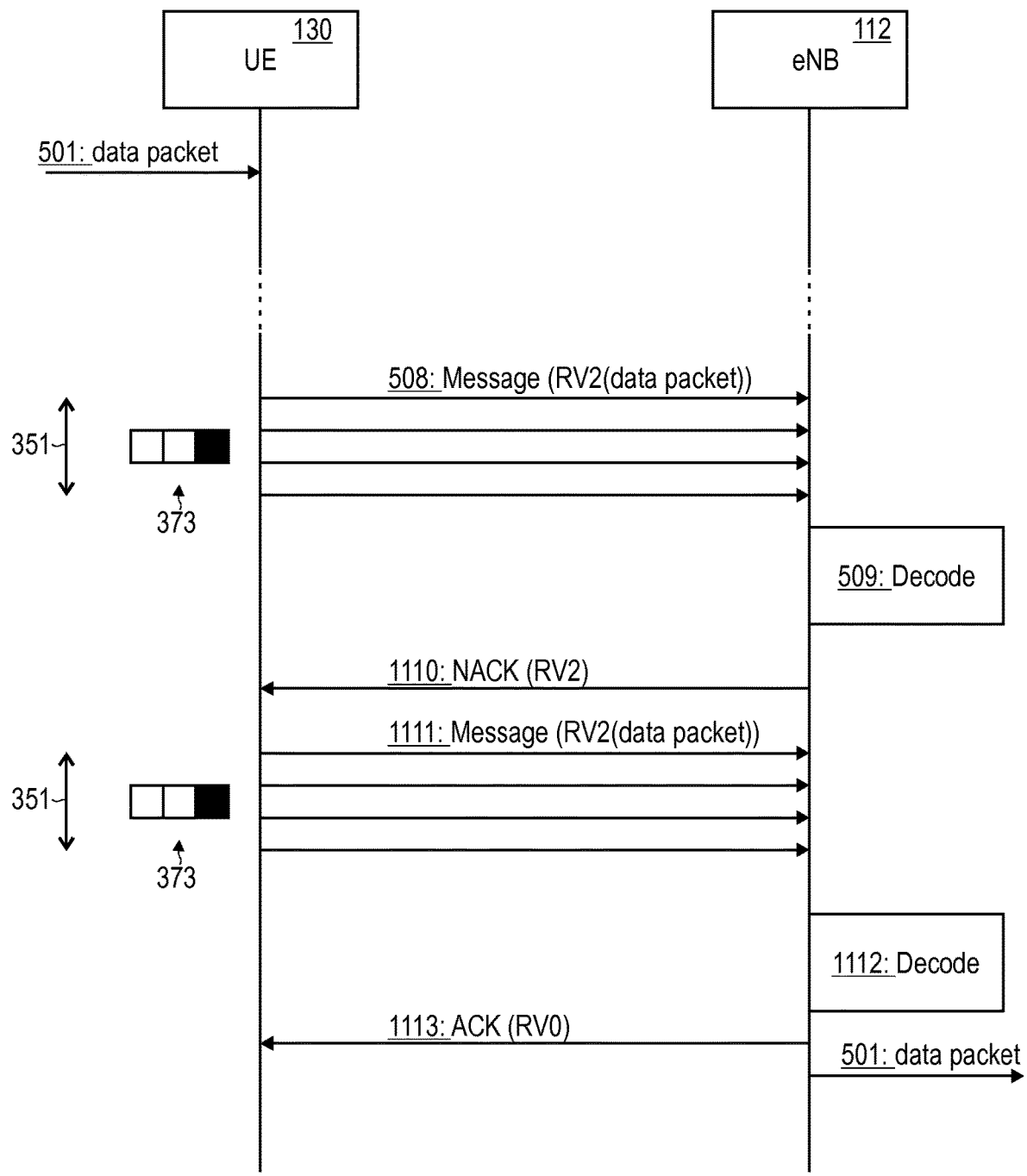
FIG. 11 generally corresponds to FIG. 10.

While in the scenario of FIG. 10 the control message 1004 has been illustrated in the context of the first redundancy version 371, generally, a corresponding control message 1110 may be sent with respect to other redundancy versions, e.g., as illustrated in FIG. 11 with respect to the third redundancy version 373. In FIG. 10, 1110 generally corresponds to 1004; 1111 generally corresponds to 1005; 1112 generally corresponds to 1006; and 1113 generally corresponds to 1007.

While with respect to FIGS. 10 and 11 scenarios have been illustrated for UL communication of the data packet 501, corresponding scenarios may be readily implemented for DL communication of a data packet.

Figure 12A:
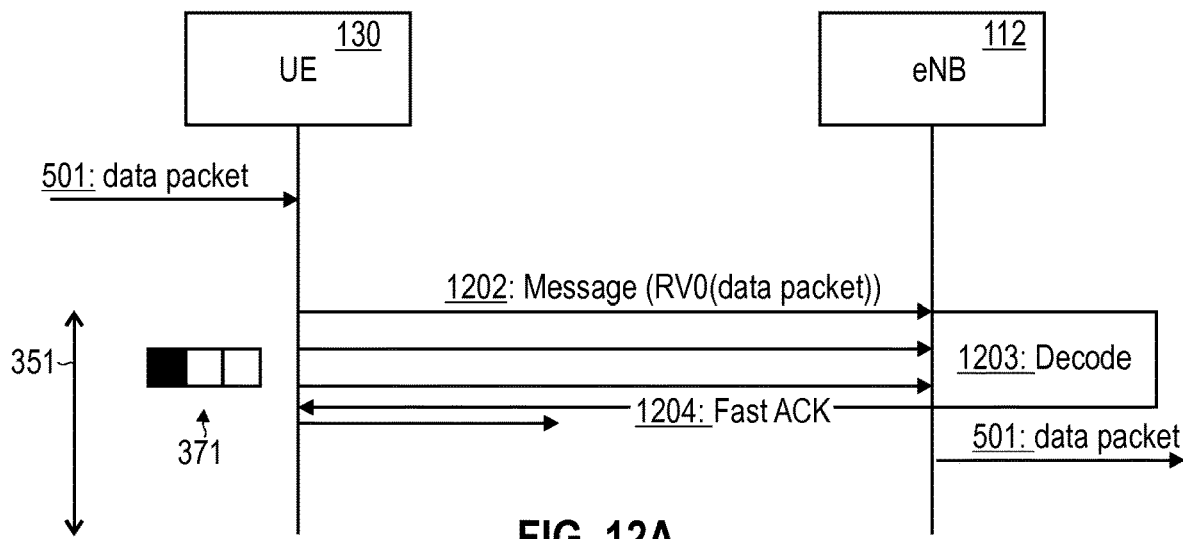
FIG. 12A is a signaling diagram illustrating aspects of sending a control message including a command prompting to abort sending of payload messages including a data packet.

FIG. 12A illustrates a second example of dynamically and flexibly adjusting the number of transmissions 901 of payload messages 1202 including a data packet 501 encoded according to a given redundancy version 371. In the example of FIG. 12A, the terminal 130 sends a plurality of payload messages 1202 on the radio link 101. The plurality of payload messages 1202 is part of a bundled transmission set 351. Each one of the plurality of payload messages 1202 includes the data packet 501 encoded according to the first redundancy version 371. In the example of FIG. 12A, the eNB 112 starts decoding the data packet 501 even before the end of the bundled transmission set 351 to which the payload messages 1202 belong to.

At a point in time before the end of the bundled transmission set 351, decoding of the data packet 501 based on the plurality of payload messages 1202 received so far succeeds and, in response to successful decoding at 1203, the eNB 112 sends a control message 1204. The control message 1204 is sent prior to the end of the bundled transmission set 351. The control message 1204 includes a command prompting the terminal 132 abort sending of payload messages including the data packet 501. The terminal 130, in response to receiving the control message 1204, aborts sending of payload messages including the data packet 501 prior to the end of the bundled transmission set 351.

As can be seen from FIG. 12A, the terminal 130 receives the control message 1204 and aborts sending of payload messages including the data packet 501 prior to the end of the bundled transmission set 351 comprising the payload messages 1202. As such, the number of the plurality of payload messages 1202 based on which the decoding at 1203 is executed is smaller than the default number 352 of payload messages of a corresponding bundling policy having been previously negotiated between the terminal 130 and the eNB 112 (the negotiating is not shown in FIG. 12A).

The control message 1204 is an ACK of the HARQ implemented by the MAC layer of the communication protocol stack of the eNB 112 and the terminal 130, respectively. From a comparison of the ACK 1204 of FIG. 12A with the conventional ACK 510 of FIG. 5, it can be seen that the ACK 1204 is sent earlier, i.e., in particular, before the end of the bundled transmission set 351. Because of this, the ACK 1204 can also be referred to as Fast ACK 1204. Because the Fast ACK 1204 is sent prior to the end of the bundled transmission set 351, sending of the messages 1202 of the bundled transmission set is still ongoing; because of this, the Fast ACK 1204 not only indicates successful decoding, but prompts to abort said sending. By sending the early version of the ACK 1204, i.e., the Fast ACK 1204, unnecessary transmissions of payload messages can be flexibly and dynamically avoided.

Also in the second example according to FIG. 12A it is possible to adhere to the reduced number of the plurality of messages 1202 required for the successful decoding at 1203 for future communication. As such, it is possible to re-negotiate between the eNB 112 and the terminal 130 the bundling policy 350 depending on said decoding. E.g., corresponding default number of payload messages including data packets according to a given redundancy version can be implicitly or explicitly signaled in between the terminal 130 and the eNB 112. Here, e.g., the control message 1204 may comprise a respective piggybacked indicator indicating the adjusted default number. It is also possible that the relative timing of the control message 1204 with respect to the duration 352 of the bundled transmission set 351 implicitly indicates the adjusted default number.

Figure 12B:
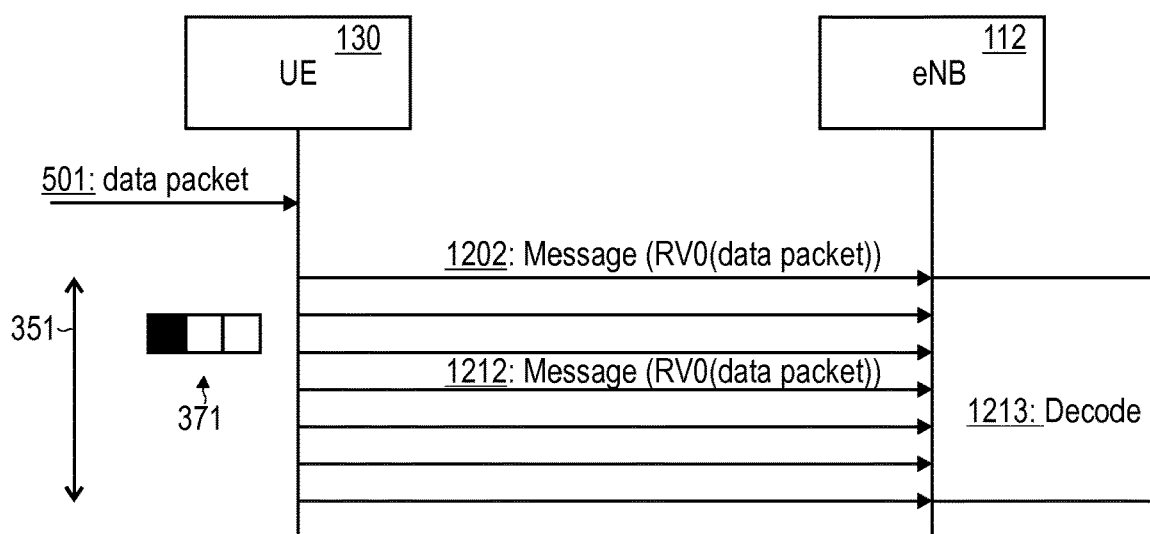
FIG. 12B generally corresponds to FIG. 12A.

FIG. 12A illustrates a scenario where decoding at 1203 is successful when operating on a comparably small number of the payload messages 1202. FIG. 12B illustrates a scenario where the decoding, at 1213, is not successful until the end of the bundled transmission set 351. Because of this, the control message 1204 is not send by the eNB 112 to the terminal 130. In particular, the eNB 112 receives, from the terminal 130, a further plurality of payload messages 1212 in addition to the payload messages 1202. Also the further plurality of payload messages 1212 includes the data packet 501 encoded according to the first redundancy version 371. The bundled transmission set 351 comprises, both, the payload messages 1202 and the payload messages 1212. Decoding, at 1213, is eventually based on the plurality of payload messages 1202 and the further plurality of payload messages 1212.

While generally a plurality of control messages 1204 including a respective command encoded according to a given redundancy version 371-373 may be sent as part of a respective bundled transmission set 351, sometimes, it may be preferable to reduce the number of control messages 1204—e.g., to a single control message 1204—to implement aborting said sending of the payload messages including the data packet 501 on a short time scale. For this, it is possible to temporarily increase to transmit power as illustrated with respect to FIG. 13.

Figure 13:
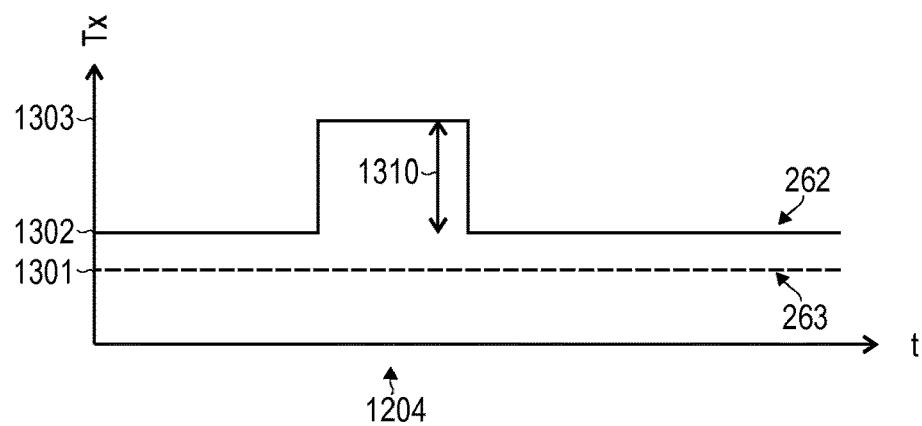
FIG. 13 illustrates a transmit power used for sending the control message of FIG. 12A.

FIG. 13 illustrates aspects of temporarily increasing or boosting the transmit power to facilitate successful reception of the control message prompting to abort sending of payload messages including the data packet. FIG. 13 illustrates a baseline transmit power 1302 associated with the PDCCH 262 (full line in FIG. 13) and a baseline transmit power 1301 associated the PDSCH 263 (dashed line in FIG. 13). As illustrated by FIG. 13, while sending the control message 1204 on the PDCCH 262, the transmit power of the PDCCH 262 is temporarily increased to a certain value 1303; e.g., the power difference 1310 may be more than 2 dB, preferably more than 6 dB, more preferably more than 12 dB.

By temporarily increasing the transmit power while sending the control message 1204, timely delivery of the control message 1204—even without the need of sending a plurality of control messages 1204 including the corresponding command encoded according to a given redundancy version 371-373—can be facilitated. At the same time, the transmit power 1301 of further channels 261, 263 implemented on the radio link 101 is not required to be adapted due to the short duration of the increase 1310.

As will be appreciated from FIGS. 12A, 12B, and 13, implementation of the control message 1204 requires the terminal 132 listen on the PDCCH 262 while transmitting on the PUSCH 263. Thus, it can be desirable to negotiate, between the eNB 112 and the terminal 130, whether the terminal 130 and the eNB 112 are capable of sending the control message 1204. Thereby, increased power consumption by the terminal 130 can be avoided in scenarios where a capability of sending the control message 1204 is not present.

While with respect to FIGS. 12A, 12B, and 13, scenarios have been illustrated for UL communication of the data packet 501, corresponding scenarios may be readily implemented for DL communication of a data packet.

Figure 14:
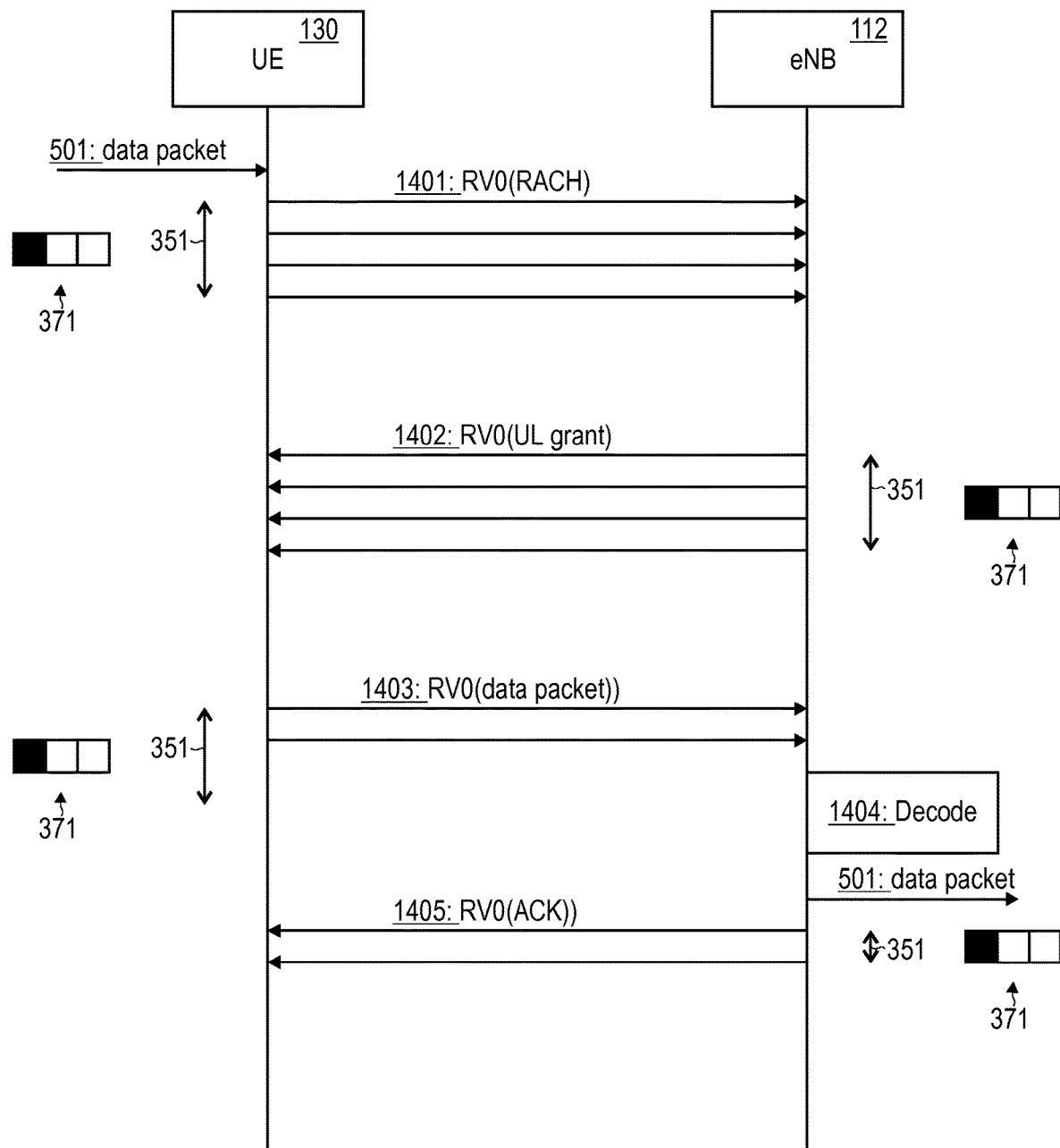
FIG. 14 is a signaling diagram illustrating aspects of sending a number of messages under a bundling policy according to various embodiments, wherein the number of messages is smaller than a default number of messages of the bundling policy.

FIG. 14 illustrates a third example of dynamically and flexibly adjusting the number of transmissions 901 of payload messages 1403 including a data packet 501 encoded according to a given redundancy version 371. In the example of FIG. 14, the terminal 130—in response to receiving a data packet 501 in a transmit buffer—attaches to the cellular network 100 by communicating on a random-access channel (RACH); the terminal 130 sends a respective plurality of control message 1401. The plurality of control messages 1401 all include an attach command encoded according to the first redundancy version 371. The plurality of control messages 1401 are part of a bundled transmission set 351. The terminal 130 determines the number of the plurality of control messages 1401, e.g., based on a quality of communicating on the radio link 101. For that purpose, the terminal 130 can employ techniques of channel sensing, etc.

The eNB 112 receives the plurality of control messages 1401. From the number of the plurality of control messages 1401, the eNB 112 can deduce the bundling policy 350 and, in particular, the default number of messages comprising data encoded according to the same redundancy version 371-373. As can be seen from FIG. 14, it is possible to negotiate the bundling policy 350 by means of the plurality of control messages 1401, i.e., as part of a random access procedure for attaching the terminal 130 to the cellular network 100 (also cf. FIG. 8B). However, while in FIG. 14 an example is illustrated where the bundling policy 350 is implicitly negotiated by means of the plurality of control messages 1401, in other examples other techniques of negotiating the bundling policy 350 may be employed (cf. FIGS. 7 and 8A).

Next, the eNB 112 responds with a plurality of control message 1402 comprising a UL grant command encoded according to the first redundancy version 371. The number of the plurality of control messages 1402 corresponds to the previously negotiated default number of the bundling policy 350. The UL grant allocates resources on the PUSCH 263 for transmission of the default number of payload messages including the data packet 501 encoded according to the first redundancy version.

After receiving the plurality of control messages 1402, the terminal 130 commences with sending a plurality of payload messages 1403 including the data packet 501 encoded according to the first redundancy version 371. However, instead of sending the default number of payload message— thus using all granted resources—, the terminal 130 sends a smaller number of payload messages 1403 as a bundled transmission set 351. In particular, as can be seen from FIG. 14, the number of the plurality of control messages 1401 is larger than the number of the payload messages 1403. As such, the terminal 130 only uses a fraction of the granted resources on the PUSCH 263 for communicating the plurality of messages 263.

At the time of sending the plurality of payload messages 1403, the bundling policy 350 specifying the default number is still in effect; as such, the plurality of payload messages 1403 are sent under the bundling policy. However, according to the example of FIG. 14, the terminal 130 has the capability of flexibly and dynamically deviating from the default number.

Various decision criteria can be taken into account by the terminal 130 when deciding to use a smaller number of the plurality of messages 1403 if compared to the default number. E.g., it is possible to consider a quality of communicating on the radio link 101, e.g., in the form of a signal-to-noise ratio of a plurality of further messages communicated on the radio link 101, e.g., the plurality of control messages 1402, a BER of a plurality of further messages communicated on the radio link 101, e.g., the plurality of control messages 1402, and a channel quality indicator of a channel 261—263 implemented on the radio link 101. Similar decision criteria may be taken into account in a UL scenario (not shown in FIG. 14) by the eNB 112.

When deciding whether to set the number of the plurality of payload messages 1403 to be smaller than the default number, the change of the quality of communicating on the radio link 101 can be monitored. If the monitoring yields a change of the quality of the communicating on the radio link 101, the number of the plurality of payload messages 1403 can be set to a smaller number if compared to the default number. In some examples, the quality of the communicating on the radio link 101 may be explicitly monitored, e.g., by considering respective channel quality indicators. In further examples, alternatively or additionally, it is possible to implicitly monitor the change of the quality of communicating on the radio link 101, e.g., based on a motion sensor signal which indicates a change of the position of the terminal 130. Monitoring the change of the quality of said communicating on the radio link 101 may be simpler or battery-efficient in some examples if compared to monitoring the absolute value of the quality of said communicating on the radio link 101.

A further decision criterion that can be taken into account by the terminal 130 when deciding to use a smaller number of the plurality of messages 1403 if compared to the default number is the default number itself. E.g., the reduction may be relative to the default number. Thereby, sudden exaggerated changes of the number of the payload messages used for communicating the data packet 501 can be avoided.

Sending the plurality of payload messages 1403 may implement implicit re-negotiating of the bundling policy 350 (cf. FIG. 8B). In particular, a new default number is communicated which equals the number of the plurality of payload messages 1403. While in the example of FIG. 14 an implicit re-negotiation of the bundling policy 350 is illustrated, in other examples other techniques of re-negotiating the bundling policy 350 may apply (cf. FIGS. 7 and 8A).

The eNB 112 successfully decodes the data packet 501 based on the plurality of payload messages 1403, 1404. The eNB 112 next sends a plurality of control messages 1405 implementing an ACK of the HARQ. The number of the plurality of control messages 1405 equals the number of the plurality of payload messages 1403. Thereby, the eNB 112 acknowledges re-negotiating of the default number of the bundling policy 500. The data packet 501 is released to higher layers.

Figure 15:
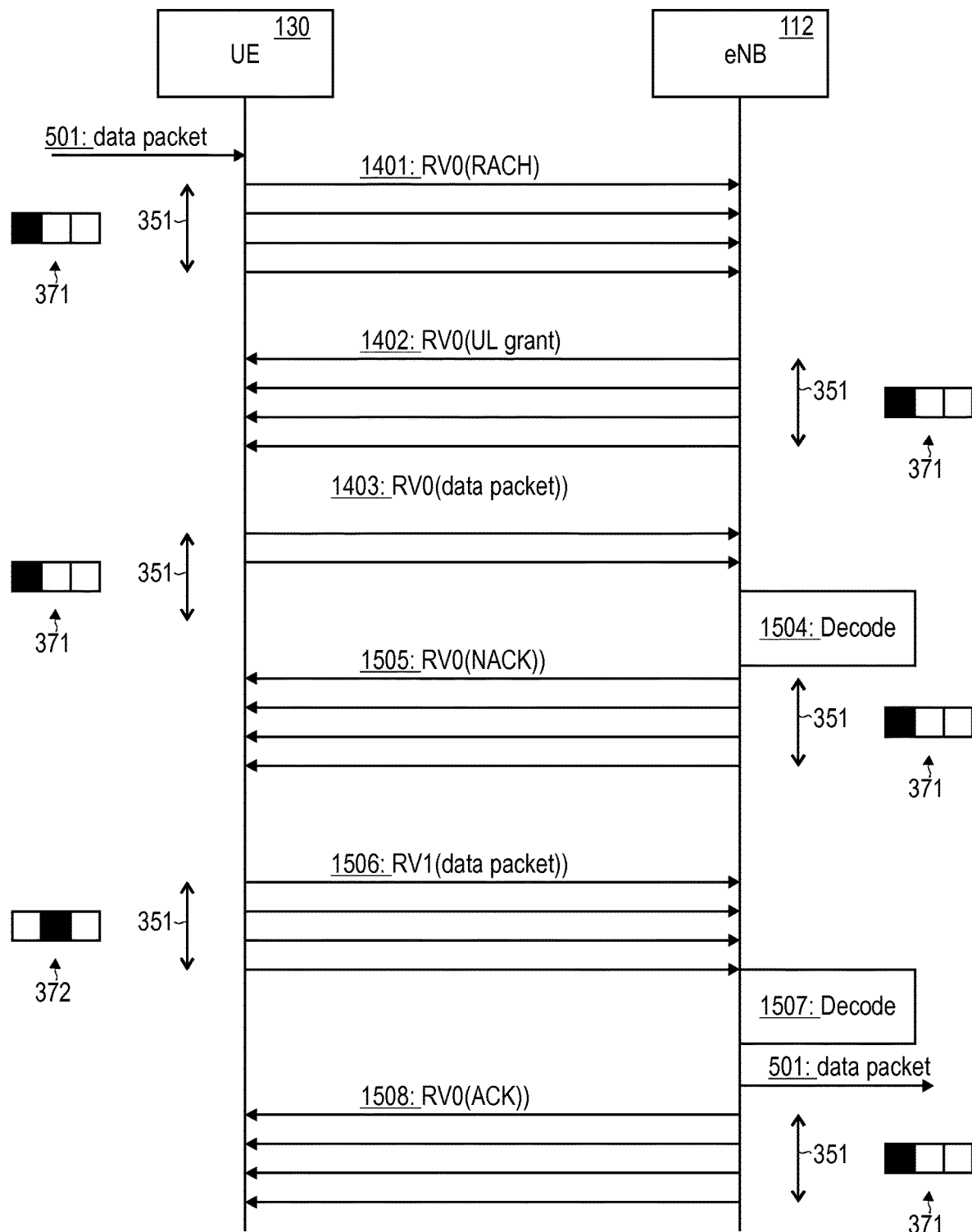
FIG. 15 generally corresponds to FIG. 14.

In FIG. 15, a scenario is shown where decoding of the plurality of payload messages 1403 fails, 1504. Because of this, the eNB 112 sends a plurality of control messages 1505 implementing a NACK of the HARQ. As can be seen from FIG. 15, the number of the plurality of control messages 1505 is larger than the number of the payload messages 1403. In particular, the number of the plurality of control messages 1505 equals the number of the initial plurality of control messages 1401, i.e., the previously valid default number of the bundling policy 350. Thereby, the eNB 112 negatively acknowledges re-negotiating of the default number of the bundling policy 500. Consequently, the terminal 130 re-sends the data packet 501; in particular, the terminal 130 sends a plurality of payload messages 1506 including the data packet encoded according to the second redundancy version 372. Also the terminal 130 falls back to the previously valid default number of the bundling policy 350 and sends a corresponding number of the plurality of payload messages 1506.

Decoding of the plurality of payload messages 1506 is successful, 1507, and the eNB 112 sends a corresponding plurality of control messages 1507. The plurality of control messages 1507 implement a ACK of the HARQ.

Figure 16:
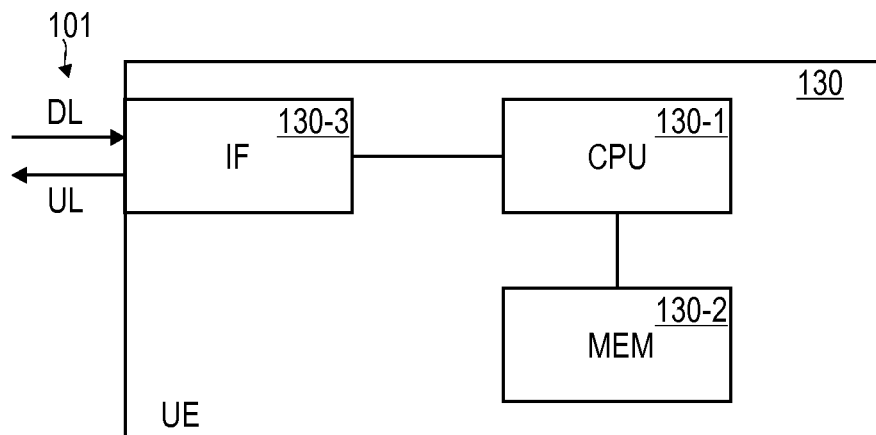
FIG. 16 schematically illustrates a terminal according to various embodiments.

As can be seen from a comparison of FIGS. 15 and 16, depending on the ACK 1405 or the NACK 1505 the negotiating of the new default number of the bundling policy 500 is positively or negatively acknowledged. As such, the re-negotiating of the bundling policy is based on receiving of the ACK 1405 or the NACK 1505.

While with respect to FIGS. 14 and 15 scenarios of a random access procedure have been discussed, respective techniques may be readily employed in different contexts.

While with respect to FIGS. 14 and 15 scenarios have been illustrated for UL communication of the data packet 501, corresponding scenarios may be readily implemented for DL communication of a data packet.

FIG. 16 schematically illustrates the terminal 130. The terminal comprises a processor 130-1, e.g., a single core or multicore processor. Distributing processing may be employed. The processor 130-1 is coupled to a memory 130-2, e.g., a non-volatile memory. The memory 130-2 may store program code that is executable by the processor 130-1. Executing the program code may cause the processor 130-1 to perform techniques as disclosed herein, e.g., relating to: sending UL messages; receiving DL messages; negotiating the bundling policy; determining a quantity of communicating on the radio link 101; encoding data according to a given redundancy version 371-373; decoding the data; monitoring a change of a quality of communicating on the radio link; etc. The terminal 130 also comprises an interface 130-3 configured to communicate with the eNB 112 on the radio link 101. The interface 130-3 may comprise an analog front end and/or a digital front end. The interface 130-3 may implement a protocol stack, e.g., according to the 3GPP LTE technology. The protocol stack may comprise a physical layer, the MAC layer, etc.

Figure 17:
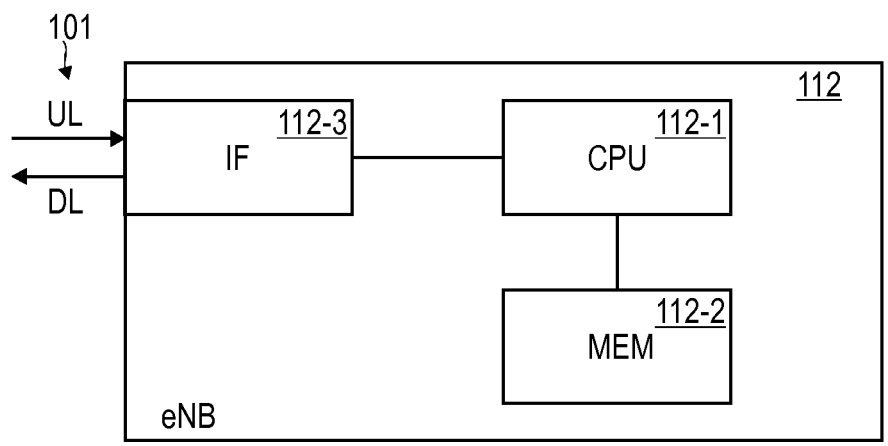
FIG. 17 schematically illustrates an access node of a cellular network according to various embodiments.

FIG. 17 schematically illustrates the eNB 112. The eNB 112 comprises a processor 112-1, e.g., a single core or multicore processor. Distributing processing may be employed. The processor 112-1 is coupled to a memory 112-2, e.g., a non-volatile memory. The memory 112-2 may store program code that is executable by the processor 112-1. Executing the program code can cause the processor 112-1 to perform techniques as disclosed herein, e.g., relating to: sending DL messages; receiving UL messages; negotiating the bundling policy; determining a quantity of communicating on the radio link 101; encoding data according to a given redundancy version 371-373; decoding the data; monitoring a change of a quality of communicating on the radio link; etc. the eNB 112 also comprises an interface 112-3 configured to communicate with the terminal 130 on the radio link 101. The interface 112-3 may comprise an analog front end and/or a digital front end. The interface 112-3 may implement a protocol stack, e.g., according to the 3GPP LTE technology. The protocol stack may comprise a physical layer, the MAC layer, etc.

Figure 18:
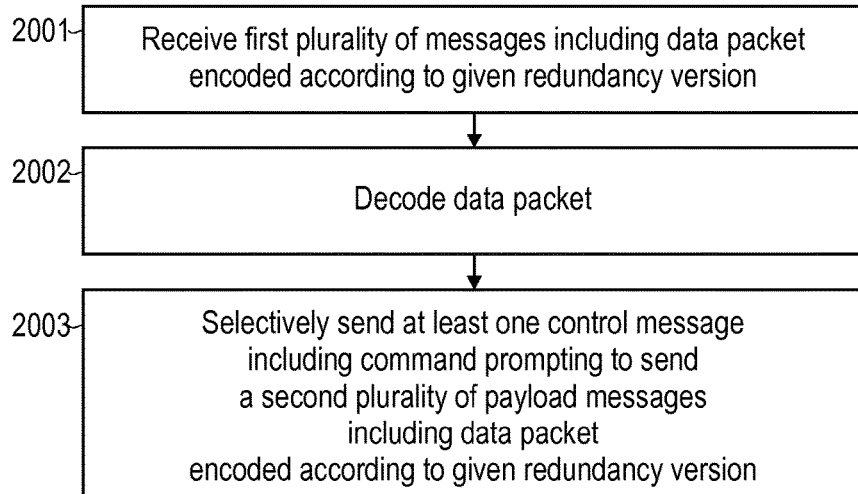
FIG. 18 is a flowchart of a method according to various embodiments.

FIG. 18 is a flowchart of a method according to various example scenarios. E.g., the method according to FIG. 18 may be executed by the processor 112-1 of the eNB 112 when executing program code stored in the memory 112-2 and/or the processor 130-1 of the terminal 130 when executing program code stored in the memory 130-2.

First, at 2001, a first plurality of payload messages is received. Each one of the first plurality of payload messages include a data packet encoded according to a given redundancy version. Hence, all payload messages of the first plurality include the data packet encoded according to the same redundancy version, e.g., the first redundancy version 371, the second redundancy version 372, or a higher-order redundancy version 373.

Next, at 2002, the data packet is decoded. Decoding at 2002 is based on the first plurality of messages is received at 2001. By considering, as part of said decoding, multiple messages, a likelihood of successful decoding is increased.

At 2003, at least one control message is selectively sent, i.e., is sent or not sent depending on certain decision criteria. The at least one control message includes a command. The command prompts to send a second plurality of payload messages. As such, the at least one control message—implicitly or explicitly—indicates that decoding at 2002 has not been successful; i.e., the at least one control message is a negative acknowledgment or NACK of the HARQ protocol. The at least one control methods prompts to send the second plurality of payload messages including the data packet encoded according to the given redundancy version, i.e., according to the same redundancy version is included in the first plurality of messages. Optionally, the at least one control message may include an indicator indicating the number of the second plurality of payload messages; the indicator may be an explicit or implicit indicator, e.g., may be a 2-bit, 4-bit, etc. value.

The method may, optionally, further include: receiving the second plurality of messages including the data packet encoded according to the given redundancy version; and decoding the data packet based on the first plurality of payload messages and the second plurality of payload messages (all not shown in FIG. 18).

Figure 19:
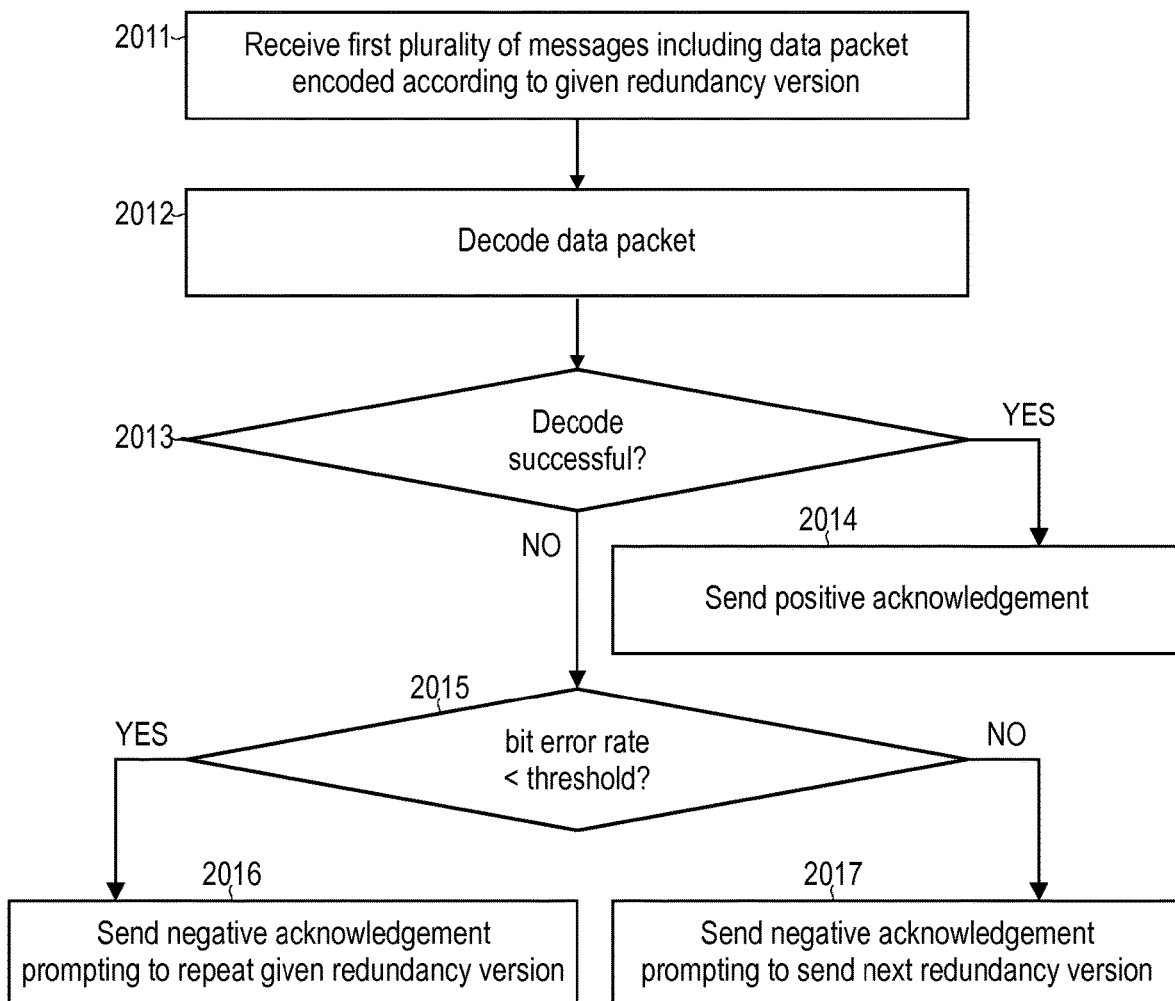
FIG. 19 is a flowchart of a method according to various embodiments.

FIG. 19 is a flowchart of a method according to various example scenarios. FIG. 19 generally corresponds to FIG. 18, but illustrates a method in greater detail. 2011, 2012 generally correspond to 2001, 2002, respectively.

At 2013, it is checked whether decoding at 2012 has been successful. At 2013, e.g., an error metric of a decoding algorithm may be taken into account. Depending on the particular decoding algorithm, different techniques of checking whether decoding has been successful may be employed.

If, at 2013, it is judged that decoding has been successful, at 2014 and ACK of the HARQ protocol is sent to the terminal. If, however, at 2013, it is judged that decoding has not been successful, at 2015 it is checked whether the BER of communicating on the radio link 101 is below a certain predefined threshold. E.g., the BER of the first plurality of messages is received at 2001 may be considered at 2015. Alternatively or additionally, it is also possible to consider different messages communicated on the radio link 101 when determining the BER at 2015. Further, alternatively or additionally to considering the BER at 2015, other figures of merit for the quality of communicating on the radio link 101 can be considered.

If, at 2015, it is judged that that BER is below the predefined threshold, at 2016 the at least one control message corresponding to an NACK is sent, the at least one control message prompting to repeat the given redundancy version has already received as part of the first plurality of messages at 2011. If, however, at 2015, it is judged that the BER is above the predefined threshold, at 2017 at least one control message corresponding to an NACK is sent which prompts to send the next redundancy version; as such, the at least one control message sent at 2017 corresponds to prior art implementations.

In some examples, sending the at least one control message at 2016 can correspond to re-negotiating a bundling policy. In detail, by requesting a certain number of additional copies of the data packet encoded according to the given redundancy version has already communicated at 2011, the default number of messages used for communication of data according to the same redundancy version can be adjusted to the sum of the number of the first plurality of messages received at 2011 and the number of further copies of the data packet according to the same redundancy version as prompted by the at least one control message at 2016 (cf. FIG. 8B). In other examples, more explicit scenarios of re-negotiating the bundling policy 350 can be employed (cf. FIGS. 7 and 8A).

Figure 20:
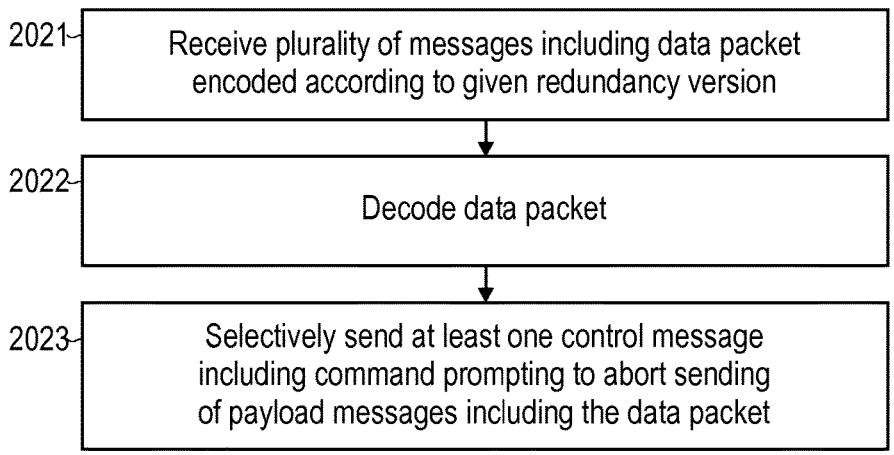
FIG. 20 is a flowchart of a method according to various embodiments.

FIG. 20 is a flowchart of a method according to various example scenarios. E.g., the method according to FIG. 20 may be executed by the processor 112-1 of the eNB 112 when executing program code stored in the memory 112-2 and/or the processor 130-1 of the terminal 130 when executing program code stored in the memory 130-2.

At 2021, a plurality of payload messages including the data packet encoded according to a given redundancy version is received. Here, all payload messages received at 2021 include the data packet encoded according to the same redundancy version, e.g., the first redundancy version 371, the second redundancy version 372, or a higher-order redundancy version 373.

Next, at 2022, the data packet is decoded based on the plurality of messages received so far at 2021. In some examples, decoding at 2022 may commence while still listening for receipt of further messages including the data packet encoded according to the given redundancy version 371-373. As such, decoding at 2022 may attempt to decode the data packet based on all payload messages received and available for decoding so far.

Next, at 2023, at least one control message is selectively sent, i.e., is sent or is not sent depending on certain decision criteria. The at least one control message includes a command prompting to abort sending of payload messages including the data packet. As such, the at least one control message—implicitly or explicitly—indicates that decoding at 2022 has been successful; i.e., the at least one control message is a positive acknowledgment or ACK of the HARQ protocol. 2023 may be executed while still listening/receiving further payload messages including the data packet encoded according to the given redundancy version. 2023 may be executed before the end of a bundled transmission set comprising the plurality of messages received at 2021. Where the plurality of messages of the bundled transmission set at 2021 are sent under a bundling policy specifying a default number of messages used for communication of data according to the same redundancy version, the number of the plurality of messages on which the decoding of the data packet is based at 2022 may be smaller than the default number.

Optionally, the method may further comprise negotiating a capability of sending the at least one control message including the command prompting to abort sending of the payload messages including the data packet, e.g., ahead of 2021.

Figure 21:
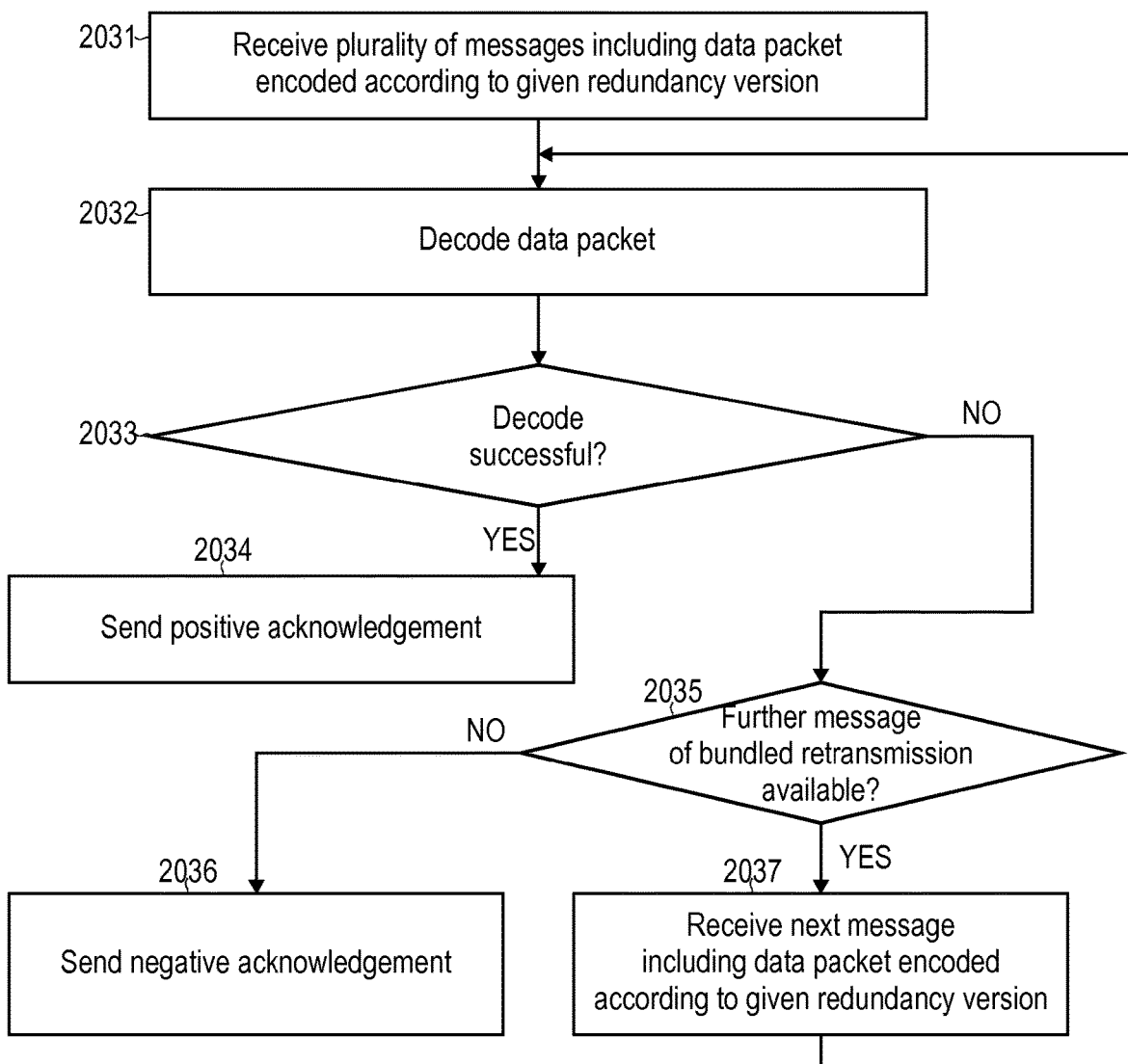
FIG. 21 is a flowchart of a method according to various embodiments.

FIG. 21 is a flowchart of a method according to various example scenarios. FIG. 21 generally corresponds to FIG. 20, but illustrates a method in greater detail. 2031, 2032 generally corresponds to 2021, 2022, respectively. 2033 generally corresponds to 2013.

2034 generally corresponds to 2014; however, it should be understood that the positive acknowledgment at 2034 can be sent earlier than the positive acknowledgment at 2014, i.e., before the end of the bundled transmission set 351. As such, the ACK of 2034 can be referred to as a Fast ACK.

In some examples it may be preferable to send the positive acknowledgment 2034 using a comparably small number of redundant control messages including the respective command encoded according to a given redundancy version; here, a temporary boost of the transmission power of the respective control channel implemented on the radio link 101 can facilitate successful receipt of the positive acknowledgment at 2034 even if a comparably small number of redundant control messages including the respective command encoded according to the given redundancy version is used. E.g., the boost 1310 may amount to 2 dB, preferably 6 dB, more preferably 12 dB.

If, at 2033 it is judged that decoding has not been successful, at 2035 it is checked whether a further message of bundled transmission is available. I.e., at 2035 it can be checked whether the end of the bundled transmission set 351 has already been reached. If further payload messages including the data packet encoded according to the given redundancy version 371-373 are available, at least one of these is received at 2037 and considered at the next attempt of decoding the data packet at 2032. As such, the basis of decoding at 2032 is successively extended to cover further payload messages including the data packet encoded according to the given redundancy version as they are received.

If, at 2035, it is judged that a further message of the bundled transmission set 351 is not available—i.e., if the end of the bundled transmission set 351 has been reached, e.g., because the default number of payload messages as specified by the bundling policy 350 has already been received—a negative acknowledgment or NACK of the HARQ is sent at 2036. The negative acknowledgment at 2036 prompts to send a further plurality of payload messages, each one of the further plurality of payload messages including the data packet encoded according to a further redundancy version 371-373 which is different to the given redundancy version 371-373 for which the payload messages have been received at 2031, 2036.

In some examples, sending of the positive acknowledgment at 2034 can correspond to re-negotiating a bundling policy. In detail, by sending that positive acknowledgment at 2034 prior to the end of the bundled transmission set, the default number of messages used for communication of data according to the same redundancy version can be adjusted to the smaller value which corresponds to the number of the plurality of messages received at 2031 and 2037 which led to successful decoding of the data packet at 2032. This number can be deduced from the temporal position of the positive acknowledgment sent at 2034 with respect to the end of the bundled transmission set 351. In other examples, more explicit scenarios of re-negotiating the bundling policy 350 can be employed, e.g., as explained above with respect to the FIGS. 7 and 8A.

Figure 22:
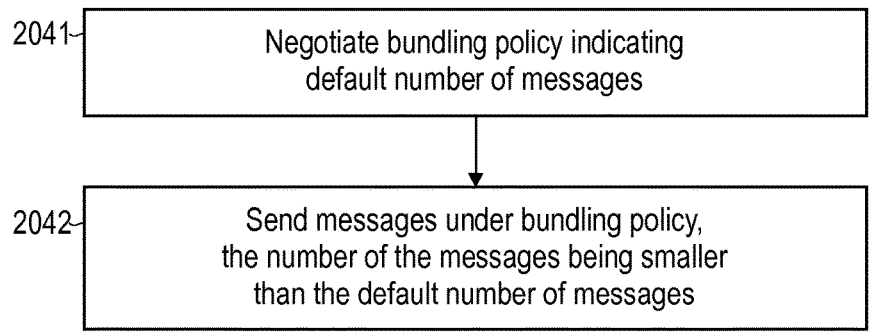
FIG. 22 is a flowchart of a method according to various embodiments.

FIG. 22 is a flowchart of a method according to various example scenarios. E.g., the method according to FIG. 20 may be executed by the processor 112-1 of the eNB 112 when executing program code stored in the memory 112-2 and/or the processor 130-1 of the terminal 130 when executing program code stored in the memory 130-2.

First, at 2041, the bundling policy 350 is negotiated, e.g., according to techniques as illustrated above with respect to FIGS. 7, 8A, and 8B. The bundling policy 350 indicates the default number of messages used for communication of data encoded according to the same redundancy version 371-372. As such, the bundling policy 350 indicates the duration 352 of the bundled transmission set 351.

At 2042, a plurality of messages is sent under the bundling policy, i.e., at a point in time with the bundling policy 350 as negotiated at 2041 is valid or assumed to be valid by the corresponding receiver. However, instead of sending the default number of the plurality of messages, at 2042 a smaller number of the plurality of messages is sent. I.e., with respect to the number of the plurality of messages, it is possible to deviate from the bundling policy 350.

Figure 23:
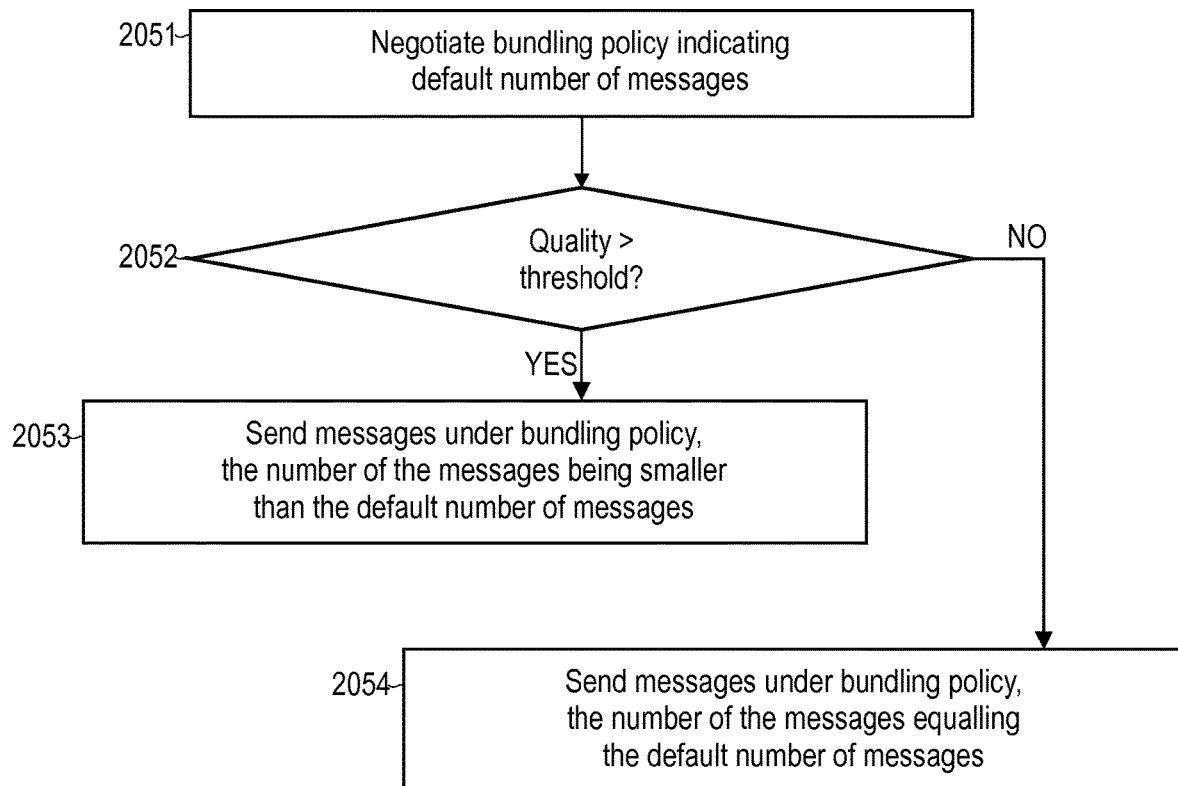
FIG. 23 is a flowchart of a method according to various embodiments.

FIG. 23 is a flowchart of a method according to various example scenarios. FIG. 23 generally corresponds to FIG. 22, but illustrates a method in greater detail. 2051 corresponds to 2041.

At 2052, it is checked whether a quality of communicating on the radio link 101 is above the predefined threshold. E.g., at 2052, one or more of the following decision criteria can be taken into account: a signal-to-noise ratio of messages communicated on the radio link 101; a BER of messages communicated on the radio link 101; and a channel quality indicator of a channel implemented on the radio link 101. As part of 2052 it is also possible to monitor the change of the quality of communicating on the radio link. This may be implemented by, e.g., tracking a position of the terminal 130; if the position of the terminal 130 significantly changes as a function of time, it is likely that the quality of communicating on the radio link 101 has also changed. Here, a motion sensor signal from, e.g., an accelerometer or a gyroscope or a Global Positioning System of the terminal 130 can be taken into account.

If, at 2052 is judged that the quality of communicating on the radio link 101 is below the predefined threshold, the plurality of messages is sent under the bundling policy where the number of the plurality of messages equals the default number of messages as specified by the bundling policy 350, 2054. If, however, the quality of communicating on the radio link 101 is above the predefined threshold, at 2053, the plurality of messages ascendant of the bundling policy where the number of the plurality of messages is smaller than the default number of messages as specified by the bundling policy 350.

The method may optionally comprise: determining the number of the plurality of messages if the quality is below the threshold. E.g., the number of the plurality of messages may be determined based on the default number of messages and/or based on the quality of communicating on the radio link 101.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while some examples have been given with respect to UL or DL only, similar techniques may be readily applied to both UL and DL.

E.g., while some examples have been given with respect to payload messages, similar techniques may be readily applied to control messages.

E.g., while above some examples have been given for the LTE E-UTRA RAT, respective techniques can be readily applied to other kinds and types of RATs. In particular, respective techniques may be readily applied to the NB-IoT RAT or the MTC RAT—which may be based at least to some degree on the LTE technology.

The invention claimed is:

1. A terminal, comprising:
an interface configured to communicate with a node of a cellular network on a radio link,
at least one processor configured to negotiate, via the interface with the node, a bundling policy indicating a default number of messages including data encoded according to a same redundancy version, wherein the at least one processor is further configured to send, via the interface to the node, a plurality of messages under the bundling policy, each one of the plurality of messages including data encoded according to a given redundancy version,
wherein the number of the plurality of messages is smaller than the default number of messages.

2. The terminal of claim 1,
wherein the at least one processor is further configured to access the interface to determine a quality of said communicating on the radio link, wherein the at least one processor is configured to determine the number of the plurality of messages based on the quality of said communicating on the radio link.

3. The terminal of claim 2,
wherein the at least one processor is configured to determine the quality of said communicating on the radio link based on at least one of a signal-to-noise ratio of a plurality of further messages, a bit error rate of the plurality of further messages, and a channel quality indicator of a channel implemented on the radio link.

4. The terminal of claim 3,
wherein each one of the plurality of further message includes an uplink grant encoded according to the given redundancy version, the uplink grant allocating resources on the channel for transmission of the default number of the plurality of messages.

5. The terminal of claim 1,
wherein the at least one processor is configured to monitor a change of a quality of said communicating on the radio link,
wherein the at least one processor is configured to selectively set the number of the plurality of messages to be smaller than the default number of messages based on said monitoring.

6. The terminal of claim 5,
wherein the at least one processor is configured to monitor the change of a quality of said communicating on the radio link based on a motion sensor signal.

7. The terminal of claim 1,
wherein the at least one processor is configured to determine the number of the plurality of messages based on the default number of messages.

8. The terminal of claim 1,
wherein the at least one processor is configured to receive, from the node and via the interface, a plurality of acknowledgement messages, each one of the plurality of acknowledgement messages including an indicator positively acknowledging receipt of the data, the indicator being encoded according to the given redundancy version,
  wherein the number of the plurality of acknowledgement messages equals the number of the plurality of messages.

9. The terminal of claim 1, wherein the at least one processor is configured to receive, from the node and via the interface, a plurality of negative acknowledgement messages, each one of the plurality of negative acknowledgement messages including an indictor negatively acknowledging receipt of the data, the indicator being encoded according to the given redundancy version,
  wherein the number of the plurality of negative acknowledgement messages equals the default number of messages.

10. The terminal of claim 1,
wherein the at least one processor is configured to selectively re-negotiate, with the node and via the interface, the bundling policy in response to sending the plurality of messages.

11. The terminal of claim 8,
wherein the at least one processor is configured to selectively re-negotiate the bundling policy based on said receiving of the acknowledgement messages or the negative acknowledgement messages.

12. A node of a cellular network, comprising:
an interface configured to communicate with a terminal attached to the cellular network on a radio link,
at least one processor configured to negotiate, via the interface with the terminal, a bundling policy indicating a default number of messages including data according to a same redundancy version,
wherein the at least one processor is further configured to receive, via the interface from the terminal, a plurality of messages under the bundling policy, each one of the plurality of messages including data encoded according to a given redundancy version,
  wherein the number of the plurality of messages is smaller than the default number of messages,
  wherein the at least one processor is configured to decode the data based on the plurality of messages.

13. The node of claim 12,
wherein the at least one processor is configured to send, to the terminal and via the interface, a plurality of acknowledgement messages if the decoding of the data based on the plurality of messages succeeds, each one of the plurality of acknowledgement messages including an indicator positively acknowledging receipt of the data, the indicator being encoded according to the given redundancy version,
  wherein the number of the plurality of acknowledgement messages equals the number of the plurality of messages.

14. The node of claim 12,
wherein the at least one processor is configured to send, to the terminal an via the interface, a plurality of negative acknowledgement messages if the decoding of the data based on the plurality of messages fails, each one of the plurality of negative acknowledgement messages including an indicator negatively acknowledging receipt of the data, the indicator being encoded according to the given redundancy version,
  wherein the number of the plurality of negative acknowledgement messages equals the default number of messages.

15. The terminal of claim 1, wherein the bundling policy is negotiated as part of a random access procedure for attaching the terminal to the cellular network.

16. The terminal of claim 1,
wherein a bundled transmission set of messages communicated in subsequent transmission intervals of a channel implemented on the radio link comprises the plurality of messages.

17. A method, comprising:
negotiating a bundling policy on a radio link, the bundling policy indicating a default number of messages including data according to a same redundancy version,
sending a plurality of messages under the bundling policy and on the radio link, each one of the plurality of messages including data encoded according to a given redundancy version,
wherein the number of the plurality of messages is smaller than the default number of messages.

18. A method, comprising:
negotiating a bundling policy on a radio link, the bundling policy indicating a default number of messages including data according to a same redundancy version,
receiving a plurality of messages under the bundling policy and on the radio link, each one of the plurality of messages including data encoded according to a given redundancy version,
wherein the number of the plurality of messages is smaller than the default number of messages,
decoding the data based on the plurality of messages.

* * * * *